US010523682B1

(12) United States Patent
Badawy et al.

(10) Patent No.: US 10,523,682 B1
(45) Date of Patent: Dec. 31, 2019

(54) SYSTEM AND METHOD FOR INTELLIGENT AGENTS FOR DECISION SUPPORT IN NETWORK IDENTITY GRAPH BASED IDENTITY MANAGEMENT ARTIFICIAL INTELLIGENCE SYSTEMS

(71) Applicant: SailPoint Technologies, Inc., Wilmington, DE (US)

(72) Inventors: Mohamed M. Badawy, Round Rock, TX (US); Jostine Fei Ho, Austin, TX (US); Rajat Kabra, Austin, TX (US)

(73) Assignee: SailPoint Technologies, Inc., Wilmington, DE (US)

(*) Notice: Subject to any disclaimer, the term of this patent is extended or adjusted under 35 U.S.C. 154(b) by 0 days.

(21) Appl. No.: 16/286,289

(22) Filed: Feb. 26, 2019

(51) Int. Cl.
| H04L 29/06 | (2006.01) |
| G06N 20/00 | (2019.01) |
| H04L 12/24 | (2006.01) |
| G06F 21/60 | (2013.01) |
| G06F 21/62 | (2013.01) |

(52) U.S. Cl.
CPC .......... H04L 63/104 (2013.01); G06F 21/604 (2013.01); G06F 21/62 (2013.01); G06N 20/00 (2019.01); H04L 41/16 (2013.01); H04L 63/08 (2013.01); H04L 63/10 (2013.01)

(58) Field of Classification Search
CPC ....... H04L 63/104; H04L 63/08; H04L 41/16; H04L 63/10; G06N 20/00; G06F 21/604; G06F 21/62; G06F 21/6218; G06F 2221/2141
See application file for complete search history.

(56) References Cited

U.S. PATENT DOCUMENTS

| 7,526,785 B1 | 4/2009 | Pearson et al. |
| 8,065,712 B1 | 11/2011 | Cheng |
| 8,209,742 B2 | 6/2012 | Schreiber et al. |
| 8,683,546 B2 | 3/2014 | Dunagan |
| 9,077,728 B1 | 7/2015 | Hart |

(Continued)

OTHER PUBLICATIONS

Saltzer, Jerome H. et al., "The Protection of Information in Computer Systems," Proceedings of the IEEE, 63(9), Sep. 1975, pp. 1278-1308.

(Continued)

*Primary Examiner* — Theodore C Parsons
(74) *Attorney, Agent, or Firm* — Sprinkle IP Law Group

(57) ABSTRACT

Systems and methods for embodiments of a graph based artificial intelligence systems for identity management are disclosed. Embodiments of the identity management systems disclosed herein may utilize a network graph approach to analyzing identities or entitlements of a distributed networked enterprise computing environment. Specifically, in certain embodiments, an artificial intelligence based identity governance systems may include an intelligent decision support agent to provide an approval or denial recommendation for an access request. To provide an approval or denial recommendation, the intelligent agent may utilize a classifier trained on historical certification data. The intelligent agent may utilize features which represent relevant signals to the approval or denial decision including features that may be associated with a network graph of the identities and entitlements of the enterprise computing environment.

21 Claims, 15 Drawing Sheets

(56) References Cited

U.S. PATENT DOCUMENTS

| | | | |
|---|---|---|---|
| 9,246,945 | B2 | 1/2016 | Chari et al. |
| 9,288,232 | B2 | 3/2016 | Chari et al. |
| 9,679,125 | B2 | 6/2017 | Bailor |
| 9,699,196 | B1 | 7/2017 | Kolman |
| 9,819,685 | B1 | 11/2017 | Scott |
| 9,992,230 | B1 | 6/2018 | Haverty |
| 10,341,430 | B1 | 7/2019 | Badawy et al. |
| 2002/0026592 | A1 | 2/2002 | Gavrila et al. |
| 2007/0067845 | A1 | 3/2007 | Wiemer |
| 2007/0226248 | A1 | 9/2007 | Darr |
| 2008/0091681 | A1 | 4/2008 | Dwivedi et al. |
| 2008/0288330 | A1 | 11/2008 | Hildebrand |
| 2009/0222894 | A1 | 9/2009 | Kenny et al. |
| 2009/0300711 | A1 | 12/2009 | Tokutani et al. |
| 2010/0082695 | A1 | 4/2010 | Hardt |
| 2010/0274815 | A1 | 10/2010 | Vanasco |
| 2011/0209196 | A1 | 8/2011 | Kennedy |
| 2012/0023576 | A1 | 1/2012 | Sorensen et al. |
| 2012/0216243 | A1 | 8/2012 | Gill et al. |
| 2012/0246098 | A1 | 9/2012 | Chari et al. |
| 2013/0232539 | A1 | 9/2013 | Polunin |
| 2013/0254833 | A1 | 9/2013 | Nicodemus et al. |
| 2013/0283339 | A1 | 10/2013 | Biswas et al. |
| 2014/0207813 | A1 | 7/2014 | Long |
| 2015/0128211 | A1 | 5/2015 | Kirner |
| 2015/0379429 | A1* | 12/2015 | Lee .................. G06N 20/00 706/11 |
| 2016/0203327 | A1 | 7/2016 | Akkiraju |
| 2016/0294645 | A1 | 10/2016 | Kirner |
| 2016/0294646 | A1 | 10/2016 | Kirner |
| 2017/0220964 | A1 | 8/2017 | Datta Ray |
| 2017/0310552 | A1 | 10/2017 | Wallerstein |
| 2017/0364534 | A1* | 12/2017 | Zhang ................. G06N 5/04 |
| 2018/0069899 | A1* | 3/2018 | Lang .................. H04L 63/20 |

OTHER PUBLICATIONS

Bishop, Matt et al., "We have Met the Enemy and He is Us," NSPW '08: Proceedings of the 2008 workshop on New Security paradigms, Sep. 2008, 11 pgs.

Frank, Mario et al., "A probabilistic approach to hybrid role mining," CCS '09, Nov. 2009, 11 pgs.

Molloy, Ian et al., "Generative Models for Access Control Policies: Applications to Role Mining Over Logs with Attribution," Proceedings of the 17th ACM Symposium on Access Control Models and Technologies, SACMAT, Jun. 2012, 11 pgs.

Blei, David M. et al., "Latent Dirichlet Allocation," Journal of Machine Learning Research 3, Jan. 2003, pp. 993-1022.

McDaniel, Patrick et al., "Securing Distributed Applications Using a Policy-based Approach," Ann Arbor, Dec. 19, 2003, 48109-2122, 24 pgs.

Chen, Ying et al., "Data Mining and Service Rating in Service-Oriented Architectures to Improve Information Sharing," 2005 IEEE Aerospace Conference, (Version 7, Updated Jan. 27, 2005) Mar. 2005, 11 pgs.

Molloy, Ian, "Automatic Migration to Role-Based Access Control," CERIAS Tech Report 2010-34, Purdue University, IN, Thesis Dissertation/Acceptance, Aug. 2010, 178 pgs.

Ene, Alina et al., "Fast Exact and Heuristic Methods for Role Minimization Problems," SACMAT '08 Proceedings of the 13th ACM symposium on Access control models and technologies, Estes, CO, Jun. 11-13, 2008, pp. 1-10.

Harrison, Michael A. et al., "Protection in Operating Systems," Communications of the ACM, vol. 19, No. 8, Aug. 1976, pp. 461-471.

Li, Ninghui et al., "Access Control Policy Combining: Theory Meets Practice," Proceedings of the 14th ACM symposium on Access control models and technologies SACMAT '09, Jun. 3-5, 2009, 10 pgs.

Schneider, Fred B., "Least Privilege and More," IEEE Security & Privacy, vol. 1, Issue 5, Sep. 2003, pp. 209-213.

Office Action for U.S. Appl. No. 13/970,174, dated Nov. 4, 2014, 22 pgs.

Office Action for U.S. Appl. No. 13/904,350, dated Nov. 14, 2014, 33 pgs.

Office Action for U.S. Appl. No. 13/904,350, dated Apr. 27, 2015, 28 pgs.

Office Action for U.S. Appl. No. 13/970,174, dated Jun. 24, 2015, 16 pgs.

Xu, Wei et al., Taint-Enhanced Policy Enforcement: A Practical Approach to Defeat a Wide Range of Attacks, 15th USENIX Security Symposium, 2006, pp. 121-136.

Notice of Allowance for U.S. Appl. No. 16/288,850, dated Aug. 1, 2019, 7 pgs.

Notice of Allowance for U.S. Appl. No. 16/417,803 dated Sep. 16, 2019, 7 pgs.

Notice of Allowance for U.S. Appl. No. 16/459,104 dated Sep. 17, 2019, 7 pgs.

* cited by examiner

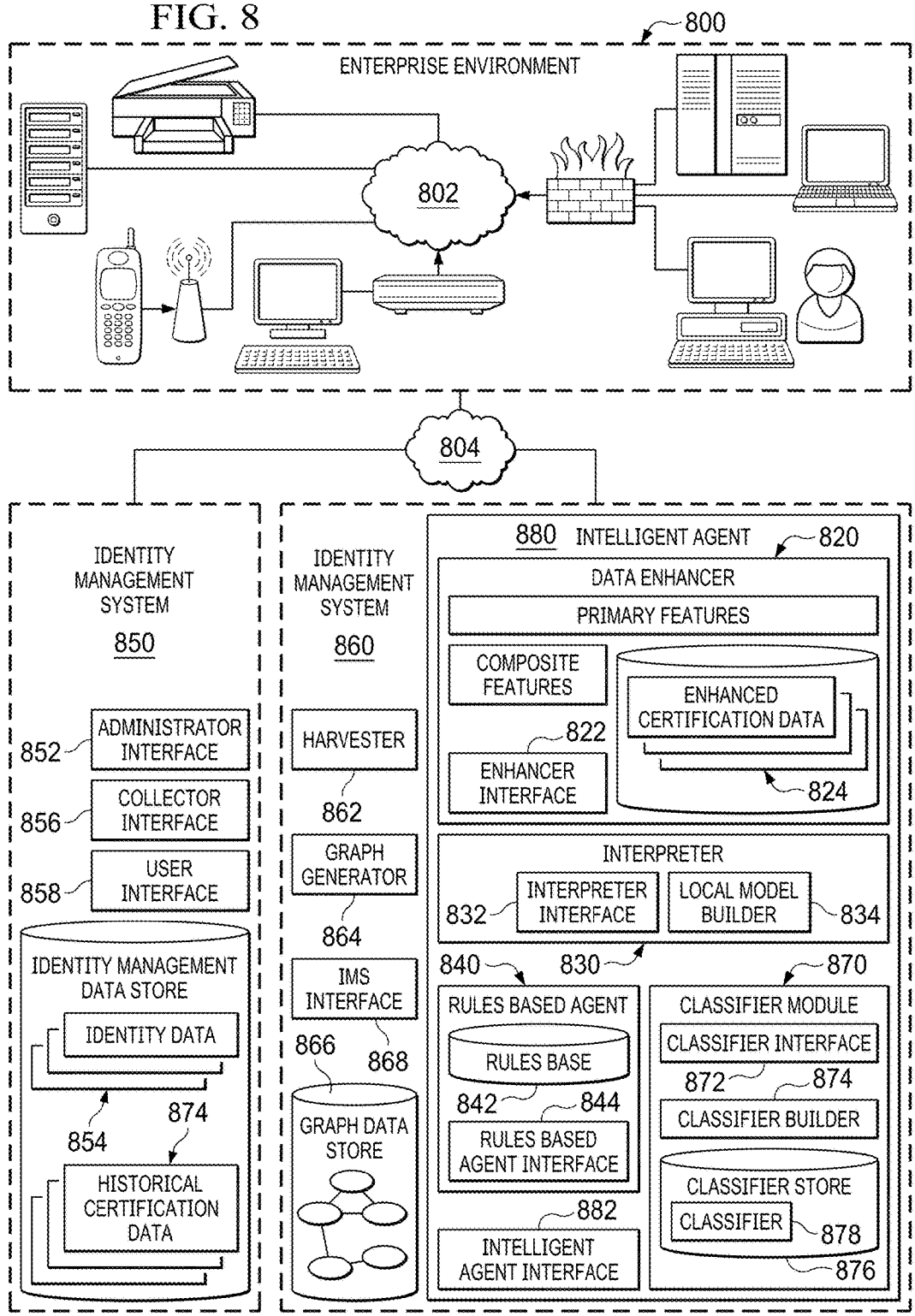

FIG. 11

SYSTEM AND METHOD FOR INTELLIGENT AGENTS FOR DECISION SUPPORT IN NETWORK IDENTITY GRAPH BASED IDENTITY MANAGEMENT ARTIFICIAL INTELLIGENCE SYSTEMS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to the application of artificial intelligence to identity management in a distributed and networked computing environment. Even more specifically, this disclosure relates to enhancing computer security in a distributed networked computing environment through the use of intelligent agents for decision support in these artificial intelligence based identity management systems, including the use of graph based identity peer grouping and analysis in association with such intelligent agents.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

However, even such proactive oversight may do little to ease the burden of compliance with regulatory requirements or the assessment of access requests for users in the enterprise environment. As but one example, enterprises are often required by regulatory agencies or for other reasons, to conduct what is known as a certification campaign. A certification campaign is typically an enterprise-wide event that is regularly performed (e.g. quarterly) to validate access entitlements for the identities in the enterprise. These campaigns may be, for example, mandated as part of internal or sometimes external auditing processes. In some cases, failure to maintain certain levels of governance can result in hefty fines by government agencies. Typically, a certification campaign has a wide coverage of a large portion, if not the totality, of the population of identities of an enterprise.

Typically, during a certification campaign, a manager or an access entitlement owner is required to certify tens if not hundreds or thousands of identities for most, if not all, the access entitlements held by these identities. In other words, the manager or an access entitlement owner may be presented with a identity and an associated entitlement and asked to approve or deny the assignment of the entitlement to the identity. Again, as there may be tens of thousands of identities and perhaps hundreds of thousands (or more) entitlements in an enterprise, this certification requires substantial time and energy resources. Typically, IG industry solutions provided these managers and access owners with bulk approval mechanisms to help automate these certification events by making it feasible for these managers to issue multiple approve/deny decisions. For example, a manager could elect to approve most of identities in-bulk for the non-privileged access entitlements in order to focus on decisions pertaining to the privileged ones. As may be imagined, such bulk approval mechanisms encouraged a less than thorough review of the actual entitlements granted each identity. Thus, instead of serving to increase security and improve identity governance within the enterprise, these bulk approval methods and identity governance solutions only served to propagate any existing security risks.

Similarly, an access request may be the formal process in enterprise identity governance, to grant an access entitlement (typically for the first time) to an identity. Usually, the manager of the identity, or the entitlement owner will have to make a decision to approve or deny the requested entitlement(s) to the said identity. Although the number of access requests may not compare to those handled during a certification campaign, access requests typically require a higher level of scrutiny as they concern rewarding highly privileged entitlements or rewarding an entitlement to an identity for the first time. However, given the bulk approval mechanisms utilized by typical IG solutions, a manager or entitlement owner may wait until a critical mass of these access requests have been built up and use such bulk solutions to evaluate these access requests en masse. Such a methodology serves to undermine either the security of an enterprise (e.g., by mass approval of the granting of entitlements, some of which may be security risks) or the functionality of the enterprise (e.g., by denying access entitlements to those identities who may actually need them to accomplish their goals).

To assist in mitigating these security risks in an enterprise environment, therefore, it is of utmost importance to effectively analyze access or entitlement data in the enterprise environment to identify potential risks and accurately assign entitlements to identities. Consequently, what is desired are improved ways to quantitatively or qualitatively analyze access data in distributed networked computing environment and to utilize the results of such analysis to improve identity governance in that environment, including the evaluation of the assignment of entitlements to identities and the approval or denial of the same.

SUMMARY

Accordingly, to ameliorate or address these issues, among other ends, embodiments of the identity management systems disclosed herein may utilize a network graph approach to improve identity governance, including the evaluation of access request for the assignment of entitlements to identities and the approval or denial of the same. Specifically, according to certain embodiments, a network graph may be utilized in association with an intelligent decision support agents and artificial-intelligence-based identity governance systems including such agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data and features related to such data, where these features may include features related to a network graph representing the identities and entitlements of the enterprise.

In particular, in certain embodiments, the intelligent agent may enhance or augment the obtained historical certification data by determining data for features or predictors which represent relevant signals to the approval or denial decision. Some of these features may include primary features that may be determined based on the historical certification data and associated identity governance data. Other features may be determined from the result of intensive artificial intelligence based data analysis performed by the artificial intelligence based identity governance system. These features may be associated with, for example, a network graph utilized to peer group the identities of the distributed networked enterprise computing environment.

This enhanced or augmented data can then be used to train and deploy the classifier. When an access request is submitted to the intelligent agent, the data enhancer may be used to determine equivalent features associated with the submitted access request. The intelligent agent can then apply the trained classifier to the submitted access request (with the associated features) to obtain an approval or denial recommendation and return such a recommendation to a user.

Certain embodiments of artificial intelligence based identity management system may utilize an interpretation agent in association with the intelligent agent user for providing the access request recommendations. Such an interpretation agent may be utilized by a user to gain insight into a particular recommendation. Specifically, embodiments of an interpretation agent may be utilized to provide the user with a number of the top or most influential features used in the determination of the recommendation for a particular access request.

Embodiments provide numerous advantages over previously available systems and methods for measuring access risk. As embodiments are based on a graph representation of identity management data, the graph structure may serve as a physical model of the data, allowing more intuitive access to the data (e.g., via graph database querying, or via graph visualization techniques). This ability may yield deeper and more relevant insights for users of identity management systems. Such abilities are also an outgrowth of the accuracy of the results produced by embodiments as disclosed.

Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of property graphs (also referred to as identity graphs) and clustering approaches by reducing the computation time and processor cycles required (e.g., and thus improving processing speed) and simultaneously reducing memory usage or other memory requirements.

Similarly, a network graph approach to peer grouping will expose and utilize the strong homophily aspects inherent in this use case. By capturing the homophilic nature of identity governance, the opportunity arises for a large number of applications of the peer groups of identity graphs, including, automation of access approval and certification campaigns.

As yet another advantage, embodiments may be dynamic with respect to time, allowing the development update processes using deltas between snapshots of data collection, bringing down operational costs and improving the performance and robustness of embodiments.

Moreover, the graph format used by certain embodiments, allows the translation of domain and enterprise specific concepts, phenomena, and issues into tangible, quantifiable, and verifiable hypotheses which may be examined or validated with graph-based algorithms. Accordingly, embodiments may be especially useful in assessing risk and in compliance with security policies or the like.

In one embodiment, an identity management system includes a graph data store storing an identity graph for an enterprise. The identity management system may execute instructions for obtaining historical certification data for the enterprise, the historical certification data comprising a set of historical certification decisions, each historical certification decision comprising a historical access request including an identity and an entitlement, and an approval or denial decision for the historical access request. The historical certification data can be enhanced with a value for a feature for each historical access certification decision, the value for the feature determined from the identity graph associated with the enterprise. A classifier can be trained with the enhanced historical certification data.

When an access request including an identity and an entitlement and a request for an approval or denial decision for the access request are received, the received access request may be enhanced with a value for the feature based on the identity or entitlement of the access request and the identity graph associated with the enterprise. The enhanced access request can be submitted to the classifier and an approval or denial decision for the enhanced access request received from the classifier. The approval or denial decision for the access request is then returned to a user of the identity management system.

In certain embodiments the identity graph associated with the enterprise may be generated by generating a first identity graph from identity management data by creating a node of the first identity graph for each of a set of identities determined from identity management data of the enterprise, the identity management data comprising data on the set of identities and a set of entitlements associated with the set of identities utilized in identity management in the enterprise. For each first identity and second identity that share at least one entitlement of the set of entitlements, an edge of the first identity graph is created between a first node representing the first identity and a second node of the identity graph representing the second identity. A similarity weight can be generated for each edge of the first identity graph between each first node and second node based on a number of the set of entitlements shared between the first identity represented by the first node and the second identity represented by the second node.

In an embodiment, the feature utilized may include a shortest distance of any path in the identity graph between a node of the identity graph associated with the identity of the access request and a node of the identity graph associated with the entitlement of the access request, or a density of the entitlement of the access request within a peer group of the identity graph associated with the identity of the access request.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 8 is a block diagram of a distributed networked computer environment including one embodiment of an identity management system with an intelligent agent.

FIGS. 11 and 12 depict interfaces that may be utilized by embodiments of an identity management system.

DETAILED DESCRIPTION

Figure 1:
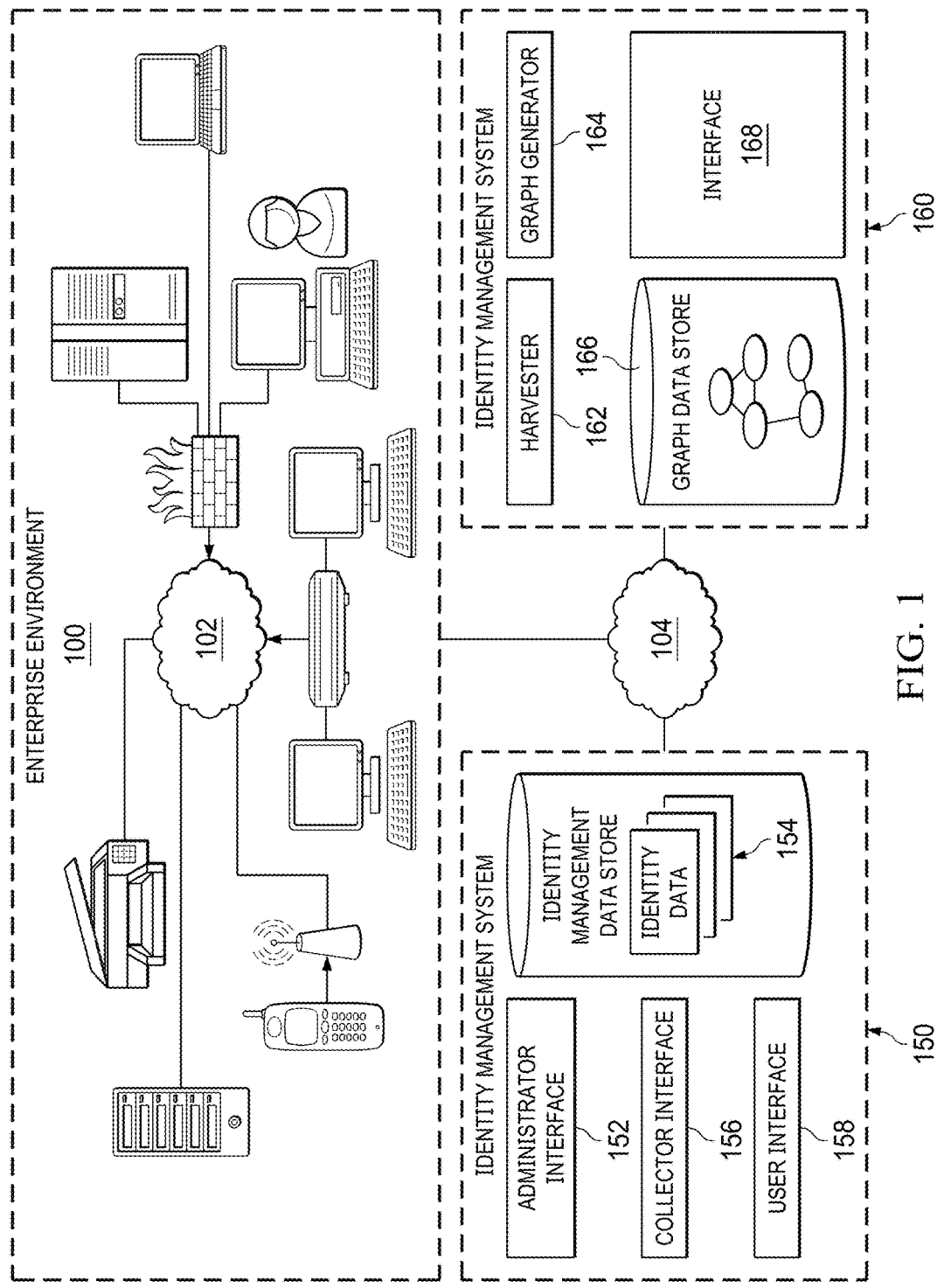
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of a function or an entity associated with an enterprise. An identity may thus represent almost physical or virtual entity, place, person or other item that an enterprise would like to define. Identities can therefore represent, for example, functions or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual entity, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

To facilitate the assignment of these entitlements, enterprises may also be provided with the ability to define roles within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity or identities to which users within the enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

However, to effectively meet the requirements and desires imposed upon enterprises for Identity Management, these enterprises may be required to prove that they have strong and consistent controls over who has access to critical applications and data. As but one example, enterprises are often required by regulatory agencies or for other reasons, to conduct what is known as a certification campaign. A certification campaign is typically an enterprise-wide event that is regularly performed (e.g. quarterly) to validate access entitlements for the identities in the enterprise. These campaigns may be, for example, mandated as part of internal or sometimes external auditing processes. In some cases, failure to maintain certain levels of governance can result in hefty fines by government agencies. Typically, a certification campaign has a wide coverage of a large portion, if not the totality, of the population of identities of an enterprise.

Typically, during a certification campaign, a manager or an access entitlement owner is required to certify tens if not hundreds or thousands of identities for most, if not all, the access entitlements held by these identities. In other words, the manager or an access entitlement owner may be presented with a identity and an associated entitlement and asked to approve or deny the assignment of the entitlement to the identity. Again, as there may be tens of thousands of identities and perhaps hundreds of thousands (or more) entitlements in an enterprise, this certification requires substantial time and energy resources. Typically, IG industry solutions provided these managers and access owners with bulk approval mechanisms to help automate these certification events by making it feasible for these managers to issue multiple approve/deny decisions. For example, a manager could elect to approve most of identities in-bulk for the non-privileged access entitlements in order to focus on decisions pertaining to the privileged ones. As may be imagined, such bulk approval mechanisms encouraged a less than through review of the actual entitlements granted each identity. Thus, instead of serving to increase security and improve identity governance within the enterprise, these bulk approval methods and identity governance solutions only served to propagate any existing security risks.

Similarly, an access request may be the formal process in enterprise identity governance, to grant an access entitlement (typically for the first time) to an identity. Usually, the manager of the identity, or the entitlement owner will have to make a decision to approve or deny the requested entitlement(s) to the said identity. Although the number of access requests may not compare to those handled during a certification campaign, access requests typically require a higher level of scrutiny as they concern rewarding highly privileged entitlements or rewarding an entitlement to an identity for the first time. However, given the bulk approval mechanisms utilized by typical IG solutions, a manager or entitlement owner may wait until a critical mass of these access requests have been built up and use such bulk solutions to evaluate these access requests en masse. Such a methodology serves to undermine either the security of an enterprise (e.g., by mass approval of the granting of entitlements, some of which may be security risks) or the functionality of the enterprise (e.g., by denying access entitlements to those identities who may actually need them to accomplish their goals).

Unfortunately, then, bulk approval mechanisms, albeit useful, can do more harm than good, as such tools get abused. Abuse of such tools may result in degrading the quality of identity governance (and thus security) within an enterprise. Some issues of concern include an explosion of entitlements, as bulk-approving mechanisms are more likely to cause an inflation of the granting of entitlements to identities that do not necessarily require them. As another concern, such bulk approval mechanisms may lead to the maintenance of access entitlements that are no longer required (e.g., when an identity changes teams, title, or business role but still keeps entitlements from prior engagements). Ultimately, the most serious concern may be the bulk approval of privileged entitlements without exercising the due diligence, resulting in an increased security risk, the exact opposite of what is intended or desired.

What is desired in identity governance solutions then, is a decision support agent that can be used to recommend approval or denial for an access request (e.g., an identity entitlement pair) that may be applied easily and substantially in real-time in bulk to a large number of these access requests without loss of accuracy or efficacy.

To that end, among others, attention is now directed to the embodiments of intelligent decision support agents and artificial intelligence based identity governance systems including such agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data, in other words, historical data on whether past access requests have been approved or denied.

In particular, in certain embodiments, the intelligent agent may enhance the obtained historical certification data by determining data for features or predictors which represent relevant signals to the approval or denial decision. Some of these features may include primary features that may be determined based on the historical certification data and associated identity governance data. Other features may be determined from the result of intensive artificial intelligence based data analysis performed by the artificial intelligence based identity governance system. These features may be associated with, for example, a network graph utilized to peer group the identities of the distributed networked enterprise computing environment.

This enhanced data can then be used to train and deploy the classifier. When an access request is submitted to the intelligent agent, the data enhancer may be used to determine equivalent features associated with the submitted access request. The intelligent agent can then apply the trained classifier to the submitted access request (with the associated features) to obtain an approval or denial recommendation and return such a recommendation to a user.

In some cases, to obtain an accurate and useful classifier, a relatively large training dataset (e.g. thousands of historical access requests and associated approval or denials) with a high signal-to-noise ratio (e.g. with sizeable and identifiable patterns that are highly correlated with the value of the approval or denial decision) may be desired. Accordingly, there may be instances where an insufficient amount of training data has been obtained by the intelligent agent or the classifier is not otherwise trained or fully utilizable. It may still be desired, however, to provide an approval or denial recommendation when an access request is submitted to the intelligent agent.

Embodiments of intelligent agents as disclosed may therefore also include a rules-based recommender. This rules-based recommender may include a set of access request evaluation rules that may be applied to an access request to determine an approval or denial recommendation and return such a recommendation to a user. Thus, when an access request is received by an intelligent agent, the intelligent agent may determine if a classifier has been trained or deployed. If no classifier has been trained or deployed, the intelligent agent may apply the data enhancer to determine features associated with the submitted access request. The intelligent agent can then apply the rules based recommender to the submitted access request (with the associated features) to obtain an approval or denial recommendation and return such a recommendation to a user. A user's response (e.g., the user's actual approval or denial of the access request) can then be recorded. In this manner, not only are embodiments of intelligent agents and artificial intelligence based identity management systems able to provide a recommendation for an access request (even in those cases where a classifier cannot yet be sufficiently utilized), but additionally, the availability of high quality historical access request data (that may subsequently be used to train a classifier) may be enhanced.

Moreover, as discussed above, one of the goals for implementing embodiments of such intelligent agents and artificial intelligence based identity governance system may be to assist decision making users in the process of making approval or denial decisions for access requests. Certain embodiments of artificial intelligence based identity management system may utilize an interpretation agent in association with the intelligent agent user for providing the access request recommendations. Such an interpretation agent may be utilized by a user to gain insight into a particular recommendation.

Specifically, an embodiment of an interpretation agent may be utilized to provide the user with a number of the top or most influential features used in the determination of the recommendation for a particular access request. This capability will help the end user to relate to the recommendation issued by the classifier and incite confidence in the classifier's results. These types of interpretation agent may work by deriving a model localized to the particular access request from the classifier based on the access request (e.g., and the features associated therewith). This localized model can then be used to determine the top or most influential features used in the determination of the recommendation for that particular access request. These top or most influential features may be presented to a user as a histogram or the like, where each feature may be associated with a representative magnitude of influence.

Embodiments as disclosed herein may thus provide decision support recommendation tool that includes an intelligent agent. Such a recommendation tool will be able to recommend accurate 'approve/deny' decisions on a access request by access request basis, but at the same time will be implemented to apply these decisions in bulk. These recommendations may be the result of training a classifier on historical certification data. Embodiments of such a classifier can detect patterns in the data and 'learn' to enable it to make the correct decision. Thus, such an approach will allow enterprises to maintain their meet or exceed their current levels of identity governance in what may be an automated manner. Enterprises may also experience improved levels of governance, as one-off, out-of-pattern, and inaccurate bulk-approvals would be denied as they deviate from established approval patterns. Additionally, enterprises may in some cases, and as part of an auditing process, be required to provide some form of reasoning (e.g. in terms of existing business rules, or governance policies) as to why certain certification or access-request items were approved or denied.

As the efficacy of embodiments of intelligent agents may depend at least partially on the classifier used, and the classifier may in turn, depend at least partially on the quality of features utilized. It may be important to select (and train the classifier according to) features which are closely associated with, or accurately reflect, the state of the identities and entitlements within a distributed computing enterprise. Before embodiments of intelligent agents are discussed in more detail, it may be useful to an understanding of certain embodiments of these intelligent agents if the analysis and use of entitlement and identities of an enterprise by embodiments of artificial intelligence identity governance systems are discussed in more detail, as such data may be used in the determination of features of certain embodiments of intelligent agents as disclosed, among other uses.

With that in mind, it may be understood that good governance practice in the identity space relies on the 'social' principle that identities with strongly similar attributes should be assigned similar, if not identical, access entitlements. In the realm of identity governance and administration, this approach allows for a separation of duties and thus makes it feasible to identify, evaluate, and prioritize risks associated with privileged access. As part of a robust identity management system, it is therefore highly desirable to analyze an enterprise's data to identify potential risks. In principle, strictly enforced pre-existing governance policies should ensure that identities with strongly similar access privileges are strongly similar. It would thus be desirable to group or cluster the identities of an enterprise into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor or other person performing a compliance analysis or evaluation to quantitatively and qualitatively assess the effectiveness of any applicable pre-existing polices, or lack thereof, and how strictly they are enforced.

However, the data utilized by most identity management systems is not strictly numerical data. Often this data includes identifications of identities (e.g., alphanumeric identifiers for an identity as maintained by an identity management system) and identifications of entitlements or roles associated with those identities (e.g., alphanumeric identifiers for entitlements or roles as maintained by the identity management system). This data may also include data identifying roles (e.g., alphanumeric identifiers or labels for a role as maintained by an identity management solution) and identifications of entitlements associated with those roles (e.g., alphanumeric identifiers for the collection of entitlements associated with those roles). Clustering of this type of categorical data (e.g., for peer grouping of identities) is typically a harder task than clustering data of numerical type. In particular, clustering categorical data is particularly challenging since intuitive, geometric-based, distance measures experienced in real life, e.g., Euclidean distance, by definition, are exclusive to numerical data. A distance measure is a crucial component of any clustering algorithm as it is utilized at the lowest level to determine how similar/dissimilar two data points are.

For example, the one-hot-encoding data transform, which can convert categorical data into numerical data, does not work in these types of cases. Due to large number of entitlements, when combining the numerical, high-dimensional, one-hot encoded data with traditional geometric distances (e.g., Euclidean), distances between data points will be quite large and will make it hard, if not impossible, for a clustering algorithm to yield meaningful outputs. This is a direct mathematical outcome to the high dimensionality of the ambient space. It is a well-documented issue in data science literature, and the applicable nomenclature is "curse of dimensionality". Typical dimensionality reduction techniques (e.g., PCA, t-SNE, etc.) have been experimented with, but due to the way these clustering algorithms manipulate numerical data, the resulting transforms may manipulate the original data in ways that are not interpretable, hence not useful in this context.

Accordingly, conventional statistical clustering such as K-modes, or K-modes used in association with a data-mining, pattern-finding algorithm such as Equivalence Class Transformation (ECLAT), have thus proven inadequate. Many of the reasons for the inadequacy of such typical clustering approaches have to do with the computationally intensive nature of the computer implementations of such clustering, which are both computationally and memory intensive, reducing or hindering the performance and responsiveness of identity management systems that utilize such clustering approaches.

Attempts to remedy these problems by altering the clustering to discard or ignore less popular identities or entitlements to enhance the signal-to-noise ratio in their application have been less than successful, achieving neither adequate results in the clusters determined or in improving the performance or memory usage of systems which employ such clustering. Other workarounds for these deficiencies have also proven unworkable to this type of identity and entitlement data.

Moreover, when attempting to cluster based on categorical data, typical clustering algorithms do not capture the social aspects of identity governance. Homophily in social networks, as defined in social sciences, is the tendency of individuals to associate and bond with similar others. In identity governance, homophily in the identity space usually results as a consequence of enforcing the governance principle that similar identities should be assigned similar access entitlements. It is thus important to attempt to capture, or otherwise utilize this homophily, when peer grouping for identity management. As a consequence of all these deficiencies, the results from prior approach to identity clustering in the context of identity management were harder to interpret, yielding fewer insights, and negatively impacting the performance, efficiency, and overall quality of identity management systems. The data-driven clustering approach of identities into peer groups remains, however, a crucial component of identity management in a distributed and networked computing environment for a variety of reasons, including the usefulness of reviewing and visualizing such clusters of identities for auditing and compliance purposes.

Accordingly, to ameliorate these issues, among other ends, embodiments of the identity management systems disclosed herein may utilize a network graph approach to peer grouping of identities and entitlements of distributed networked enterprise computing environment. Specifically, in certain embodiments, data on the identities and the respective entitlements assigned to each identity as utilized in an enterprise computer environment may be obtained by an identity management system. Using the identity and entitlement data, then, a network identity graph may be constructed, where the nodes of the graph correspond to, and represent, each of the identities or entitlements. Each edge (or relationship) of the graph may join two nodes of the graph and be associated with a similarity weight representing a degree of similarity between the identities or entitlements of the respective nodes. The identity graph may then be pruned to remove weak edges (e.g., those edges whose similarity weight may fall below a pruning threshold). The pruned identity graph can then be clustered into peer groups of identities or entitlement groups (e.g., using a graph based community detection algorithm). These peer groups of identities (or entitlements) can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities or entitlements may be optimized based on a peer group assessment metric, such as, for example, graph modularity determined based on the identity graph or the determined peer groups. For instance, in one embodiment, if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities or entitlements and a peer group assessment metric determined based on the newly pruned identity graph or the newly determined peer groups. If this new peer assessment metric is now above (or below) the quality threshold the feedback loop may stop and these peer groups of identities or entitlements can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups of identities or entitlements resulting from the clustering) may more accurately reflect particular requirements or the needs of a particular enterprise or be better tailored to a particular use.

Embodiments may thus provide a number of advantages including allowing more intuitive access to the data (e.g., via graph database querying, or via graph visualization techniques), which may, in turn, yield deeper and more relevant insights for users of identity management systems. Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments. Likewise, embodiments may be dynamic with respect to time, allowing the development update processes using deltas between snapshots of data collection, bringing down operational costs and improving the performance and robustness of embodiments. Moreover, the graph format used by certain embodiments, allows the translation of domain and enterprise specific concepts, phenomena, and issues into tangible, quantifiable, and verifiable hypotheses which may be examine or validate with graph based algorithms. Accordingly, embodiments may be especially useful in assessing risk and in compliance with security policies or the like.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities, one or more entitlements, or one or more roles, and associate defined identities with entitlements using, for example, an administrator interface 152. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a capacity, groups, processes, physical locations, individual users or humans or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 100. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 150. A role within the context of the identity management system 150 may be a collection of entitlements. These roles may be assigned a name or identifiers (e.g., manager_1, engineer_level_2, team leader) by an enterprise that designate the type of user or identity that should be assigned such a role. By assigning a role to an identity using the identity management system 150, the identity may be assigned the corresponding collection of entitlements associated with the assigned role.

The identity management system 150 may thus store identity management data 154. The identity management data 154 stored may include a set entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, roles, entitlements, events or generally preform identity management with respect to enterprise environment 100.

As part of a robust identity management system, it is desirable to analyze the identity management data 154 associated with an enterprise 100. Specifically, It is desirable to group or cluster the identities or entitlements of an enterprise 100 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed.

Peer grouping of the identities within an enterprise (or viewing the peer groups of identities) may allow, for example, an auditor other person performing a compliance analysis or evaluation to quantitatively and qualitatively assess the effectiveness of any applicable pre-existing polices, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 150 and allow users of the identity management system 150 greater visibility into the roles of the enterprise 100.

Accordingly, an identity management system 160 may include a harvester 162 and a graph generator 164. The harvester 162 may obtain identity management data from one or more identity management systems 150 associated with enterprise 100. The identity management data may be obtained, for example, as part of a regular collection or harvesting process performed at some regular interval by connecting to, and requesting the identity management data from, the identity management system 150. The identity management data stored may thus include a set entries, each entry corresponding to and including an identity as defined and managed by the identity management system, a list or vector of entitlements or roles assigned to that identity by the identity management system, and a time stamp at which the identity management data was collected from the identity management system 150. The identity management data may also include a set entries for roles, each entry corresponding to and including a role as defined and managed by the identity management system 150 and a list or vector of entitlements assigned to that role by the identity management system 150, and a time stamp at which that identity management data was collected from the identity management system 150.

Graph generator 164 may generate a peer grouped identity graph from the obtained identity management data. Specifically, in one embodiment, a property (identity) graph may be generated from the identity management data obtained from the enterprise. Each of the identities and entitlements from the most recently obtained identity management data may be determined and a node of the graph created for each identity and entitlement. An edge is constructed between every pair of nodes (e.g., identities) that shares at least one entitlement and between every pair of nodes (e.g., entitlements) that shares at least one identity. Each edge of the graph may also be associated with a similarity weight representing a degree of similarity between the identities of the respective nodes joined by that edge, or between the entitlements of the respective nodes joined by that edge. It will be noted here that while a similarity weight may be utilized on edges between both identity nodes and entitlement nodes, the similarity weight type, determination and value may be determined differently based upon the respective type of node(s) being joined that weighted edge. Accordingly, the obtained identity management data may be represented by an identity graph (e.g., per enterprise) and stored in graph data store 166.

Once the identity graph is generated by the graph generator 164, the graph may then be pruned to remove edges based on their weighting. Again, the pruning of edges between identity nodes and entitlements nodes may be accomplished in the same, or a different manner. For example, a pruning threshold utilized to prune edges between identity nodes may be different than a pruning threshold utilized to prune edges between entitlement nodes as well as across customers.

The pruned identity graph can then be used to cluster the identities into peer groups of identities or to cluster the entitlements into peer groups of entitlements. This clustering may be accomplished, for example, a community-detection algorithm. This clustering result may also be optimized by the graph generator 164 through the use of a feedback loop to optimize the pruning of the edges until a desired metric for assessing the quality of the peer groups generated exceeds a desired threshold or satisfies certain (e.g., optimization or other) criteria. It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric may all be the same or different when clustering the identity or entitlements of the entitlement graph. More generally, then, the pruning and clustering of the identity nodes of the identity graph may be performed separately from the pruning and clustering of the entitlement nodes of the identity graph. Accordingly, the property graph may comprise at least two subgraphs, the identities subgraph comprising at least the identity nodes and edges between these identity nodes and the entitlement subgraph comprising at least the entitlement nodes and edges between those entitlement nodes.

Once the peer groups of identities or entitlements are determined, the peer groups can then be stored (e.g., separately or in the property graph itself) and used by the identity management system 160. For example, each peer group of identities (also referred to herein as an identity group) may be assigned a peer group identifier and the peer group identifier associated with each identity assigned to the peer group by storing the peer group identifier in association with the node in the graph representing that identity. Similarly, each peer group of entitlements (e.g., also referred to herein as an entitlement group) may be assigned a peer group identifier and the peer group identifier associated with each entitlement assigned to the peer group by storing the peer group identifier in association with the node in the graph representing that entitlement.

An interface 168 of the identity management system 160 may use the identity graph in the graph data store 166 or associated peer groups to present one or more interface which may be used for risk assessment, as will be discussed. For example, an interface 168 may present a visual representation of the graph, the identities, entitlements, or the peer groups in the identity graph to a user of the identity management system 160 associated with enterprise 100 to assist in compliance or certification assessments or evaluation of the identities, entitlements or roles as currently used by the enterprise (e.g., as represented in identity management data 154 of identity management system 150).

Before moving on, it will be noted here that while identity management system 160 and identity management system 150 have been depicted separately for purposes of explanation and illustration, it will be apparent that the functionality of identity management systems 150, 160 may be combined into a single or a plurality of identity management system as is desired for a particular embodiment and the depiction and separation of the identity management systems and their respective functionality has been depicted separately solely for purposes of ease of depiction and description.

Figure 2:
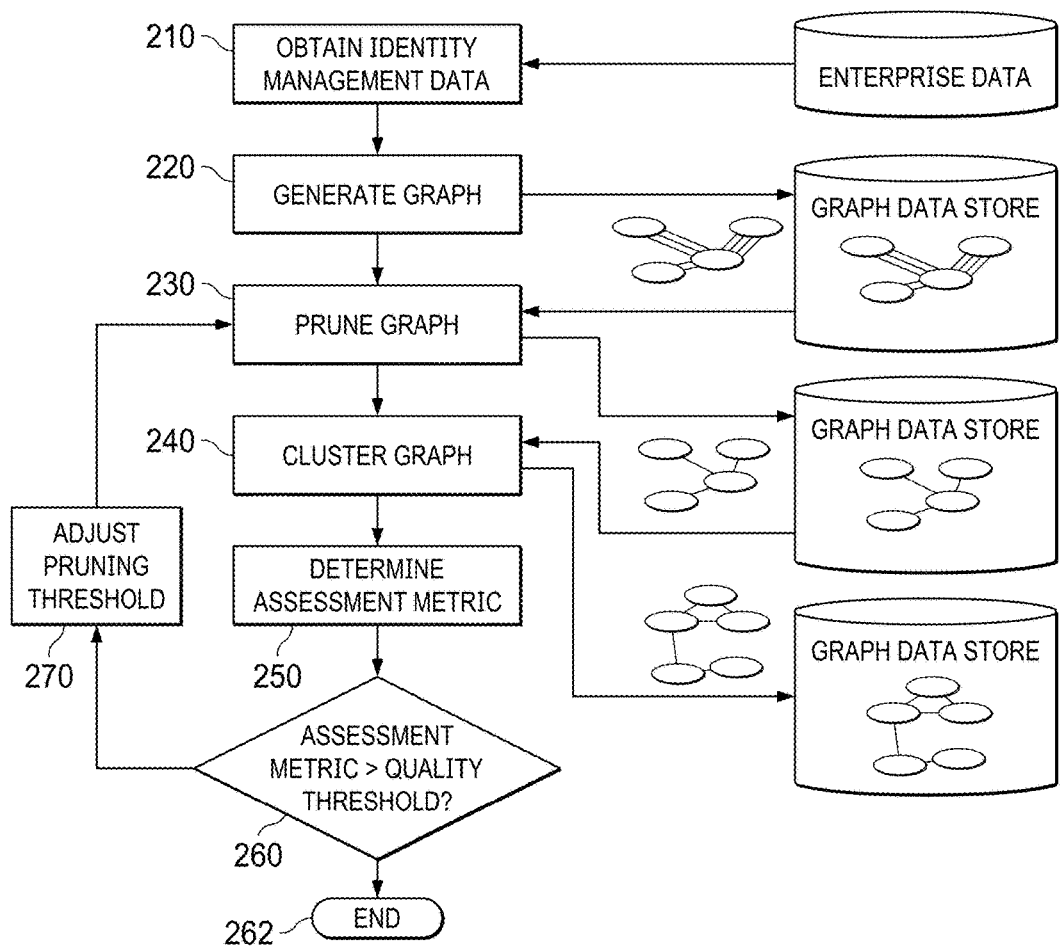
FIG. 2 is a flow diagram of one embodiment of a method for peer group detection and analysis using cluster based analysis of identity graphs.

Turning now to FIG. 2, a flow diagram for one embodiment of a method for determining peer groups of identities using a graph database is depicted. Embodiments of such a method may be employed by graph generators of identity management systems to generate identity graphs and associated peer groups from identity management data, as discussed above. It will be noted here, that while this embodiment is described in association with the determination of peer groups of identities in the identity graph, similar embodiments may be applied to entitlement nodes and associated similarity relationships of an identity graph to determine peer groups of entitlements in such an identity graph.

Initially, at step 210, identity management data may be obtained. As discussed, in one embodiment, this identity management data may be obtained from one or more identity management systems that are deployed in association with an enterprise's distributed computing environment. Thus, the identity management data may be obtained, for example, as part of a regular collection or harvesting process performed at some regular interval by connecting to, requesting the identity management data from, an identity management system. The identity management data may also be obtained on a one-time or user initiated basis.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same times stamp can thus be thought of as a snapshot from that time of the identities and entitlements of the enterprise computing environment as management by the identity management system.

As an example of identity management data that may be obtained from an identity management system, the following is one example of a JavaScript Object Notation (JSON) object that may relate to an identity:

{
  "attributes": {
    "Department": "Finance",
    "costcenter": "[R01e, L03]",
    "displayName": "Catherine Simmons",
    "email":
      "Catherine.Simmons@demoexample.com",
    "empId": "1b2c3d",
    "firstname": "Catherine",
    "inactive": "false",
    "jobtitle": "Treasury Analyst",
    "lastname": "Simmons",
    "location": "London",
    "manager": "Amanda.Ross",
    "region": "Europe",
    "riskScore": 528,
    "startDate": "12/31/2016 00:00:00 AM UTC",
    "nativeIdentity_source_2": "source_2",
    "awesome_attribute_source_1": "source_1",
    "twin_attribute_a": "twin a",
    "twin_attribute_b": "twin b",
    "twin_attribute_c": "twin c"
  },
  "id": "2c9084ee5a8de328015a8de370100082",
  "integration_id": "iiq",

```
    "customer_id": "ida-bali",
    "meta": {
        "created": "2017-03-02T07:19:37.233Z",
        "modified": "2017-03-02T07:24:12.024Z"
    },
    "name": "Catherine. Simmons",
    "refs": {
        "accounts": {
            "id": [
                "2c9084ee5a8de328015a8de370110083"
            ],
            "type": "account"
        },
        "entitlements": {
            "id": [
                "2c9084ee5a8de328015a8de449060e54",
                "2c9084ee5a8de328015a8de449060e55"
            ],
            "type": "entitlement"
        },
        "manager": {
            "id": [
                "2c9084ee5a8de022015a8de0c52b031d"
            ],
            "type": "identity"
        }
    },
    "type": "identity"
}
```

As another example of identity management data that may be obtained from an identity management system, the following is one example of a JSON object that may relate to an entitlement:

```
{
    "integration_id": "bd992e37-bbe7-45ae-bbbf-c97a59194cbc",
    "refs": {
        "application": {
            "id": [
                "2c948083616ca13a01616ca1d4aa0301"
            ],
            "type": "application"
        }
    },
    "meta": {
        "created": "2018-02-06T19:40:08.005Z",
        "modified": "2018-02-06T19:40:08.018Z"
    },
    "name": "Domain Administrators",
    "attributes": {
        "description": "Domain Administrators group on Active Directory",
        "attribute": "memberOf",
        "aggregated": true,
        "requestable": true,
        "type": "group",
        "value": "cn=Domain Administrators,dc=domain,dc=local"
    },
    "id": "2c948083616ca13a01616ca1f1c50377",
    "type": "entitlement",
    "customer_id": "3a60b474-4f43-4523-83d1-eb0fd571828f"
}
```

At step 220 an identity graph may be generated from the identity management data obtained from the enterprise. Specifically, each of the identities and entitlements from the most recent snapshot of identity management data may be obtained and a node of the graph created for each identity and entitlement. An edge is constructed between every pair of identity nodes (e.g., identities) that shares at least one entitlement (e.g., an edge connects two identity nodes if and only if they have at least one entitlement in common). An edge may also be constructed between every pair of entitlement nodes (e.g., entitlements) that shares at least one identity (e.g., an edge connects two entitlement nodes if and only if they have at least one identity in common).

Each edge of the graph joining identity nodes or entitlement nodes may be associated with a similarity weight representing a degree of similarity between the identities or entitlements of the respective nodes joined by that edge. For identity nodes, the similarity weight of an edge joining the two identity nodes may be generated based on the number of entitlements shared between the two joined nodes. As but one example, the similarity weight could be based on a count of the similarity (e.g., overlap or intersection of entitlements) between the two identities divided by the union of entitlements. Similarly, for identity nodes, the similarity weight of an edge joining the two entitlement nodes may be generated based on the number of identities shared between the two joined nodes. As but one example, the similarity weight could be based on a count of the similarity (e.g., overlap or intersection of identities) between the two entitlements divided by the union of identities. For instance the similarity could be defined as the ratio between a number of identities having both entitlements joined by the edge to the number of identities that have either one (e.g., including both) of the two entitlements.

In one embodiment, the edges are weighted via a proper similarity function (e.g., Jaccard similarity). In one embodiment, a dissimilarity measure, of entitlement or identity binary vectors, d, may be chosen, then the induced similarity, $1-d(x,y)$, may be used to assign a similarity weight to the edge joining the nodes, $x,y$. Other methods for determining a similarity weight between two nodes are possible and are fully contemplated herein. Moreover, it will be noted here that while a similarity weight may be utilized on edges between both identity nodes and entitlement nodes, the similarity weight type, determination and value may be determined differently based upon the respective type of node(s) being joined that weighted edge.

In one specific, embodiment, a symmetric matrix for identities (e.g., an identity adjacency matrix) may be determined with each of the identities along each axis of the matrix. The diagonal of the matrix may be all 0s while the rest of values are the similarity weights determined between the two (identity) nodes on the axes corresponding to the value. In this manner, this symmetric matrix may be provided to a graph constructor which translates the identities on the axes and the similarity values of the matrix into graph store commands to construct the identity graph. Similarly, a symmetric matrix for entitlements (e.g., an entitlement adjacency matrix) may be determined with each of the entitlements along each axis of the matrix. The diagonal of the matrix may be all 0s while the rest of values are the similarity weights determined between the two (entitlement) nodes on the axes corresponding to the value. In this manner, this symmetric matrix may be provided to a graph constructor which translates the entitlement on the axes and the similarity values of the matrix into graph store commands to construct the identity graph.

Accordingly, the identity management data may be faithfully represented by a graph, with k types of entities (nodes/vertices, e.g., identity-id, title, location, entitlement, etc.) and stored in a graph data store. It will be noted that graph data store 132 may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

Once the identity graph is generated, the graph may then be pruned at step 230. Here, the identity graph may be pruned to remove weak edges (e.g., those edges whose similarity weight may fall below a pruning threshold). The pruning of the graph is associated with the locality aspect of identity governance, where an identity's access entitlements should not be directly impacted, if at all, by another identity with strongly dissimilar entitlement pattern (e.g., a weak connecting edge) or that determined should be based on strong commonality or popularity of entitlements within an identity grouping. Accordingly, the removal of such edges may not dramatically alter the global topology of the identity graph. An initial pruning threshold may be initially set or determined (e.g., as 50% similarity or the like) and may be substantially optimized or otherwise adjusted at a later point. As another example, a histogram of similarity weights may be constructed and a similarity weight corresponding to a gap in the similarity weights of the histogram may be chosen as an initial pruning threshold. Again, the pruning of edges between identity nodes and entitlements nodes may be accomplished in the same, or a different manner. For example, the pruning threshold utilized to prune edges between identity nodes may be different than a pruning threshold utilized to prune edges between entitlement nodes.

The pruned identity graph can then be used to cluster the identities or entitlements into peer groups of identities or peer groups of entitlements at step 240. Within this graph approach, a representation of a peer group of identities could be represented by a maximal clique, where every identity is strongly connected (e.g., similar) to every other identity within the identity peer group, and consequently, members of the clique all share a relatively large, and hence dominant, common core of entitlements. A representation of an entitlement peer group could be represented by a maximal clique, where every entitlement is strongly connected (e.g., similar) to every other entitlement within the peer group, and consequently, members of the clique all share a relatively large, and hence dominant, common core of identities. The problem of finding all maximal cliques of a graph may, however, be a memory and computationally intensive problem. Most clique related problems in graph theory are hard and some of them are even NP-complete, requiring exponential time to finish as graphs with exponentially many maximal cliques may exist.

Accordingly, in one embodiment a community-detection algorithm may be utilized for peer grouping the identities or entitlements of the identity graph to speed the determination of the peer groups, reduce computational overhead and conserve memory, among other advantages. A plethora of applicable and performant community-detection and graph clustering algorithms may be utilized according to certain embodiments. Some of these algorithms are specifically targeted to large graphs, which can be loosely described as graphs with at least tens or hundreds (or more) of thousands of nodes and millions of edges. Such graph community-detection algorithms may include, for example, Louvain, Leiden, Fast-greedy, Label Propagation or Stochastic Block Modeling. Other graph community detection algorithms may be utilized and are fully contemplated herein.

In certain embodiments, a clustering result may be optimized through the use of a feedback loop, as discussed below. As such, in one embodiment it may be desirable to utilize a community-detection algorithm for determination of the peer groups that may provide allow a straightforward determination of a peer group assessment metric for a quality assessment of determined peer groups or the identity graph. Accordingly, a community-detection algorithm that may be based on, or allow a determination of, a graph based metric (e.g., modularity, evolving topology, connected components, centrality measures (e.g., betweenness, closeness, community overlap measures such as NMI or Omega indices)) that may be used as a peer group assessment metric may be utilized.

Specifically, in one embodiment, the Louvain algorithm may be utilized as a community-detection algorithm and modularity may be used as a peer assessment metric. The Louvain algorithm may not only be a scalable algorithm that can handle, and be efficient on, large graphs; but additionally the Louvain algorithm may be based on modularity or be modularity optimized. Modularity is a scalar that can be determined for a graph or groups or subgraphs thereof. This modularity reflects a likelihood of the clusters generated (e.g., by the algorithm) to not have been generated by random chance. A high modularity value, (e.g., positive and away from 0) may indicate that the clustering result is unlikely to be a product of chance. This modularity can thus be used as a peer group assessment metric.

Moreover, in addition to the application of a peer group assessment metric to optimize the peer groups or identity graphs determined using such community-detection algorithms, an identity management system may employ alerts based these peer group assessment metrics. For example, an alert to a user may be based on an alert threshold (e.g., if the peer group assessment metric drops below or above a certain threshold) or if any changes over a certain threshold occur with respect to the peer group assessment metric. For example, setting an empirical low threshold for modularity, with combined user alerts, could serve as a warning for deteriorating quality of peer groups or the identity graph. This could be due to input data has been corrupted at some point in pipeline, or in other cases, that the access entitlement process for the particular enterprise is extremely lacking due discipline. Regardless of the underlying cause, such an early warning system may be valuable to stop the propagation of questionable data quality in the peer group assessment and determination process and more generally to identity management goals within the enterprise.

In many cases, the community-detection or other clustering algorithm utilized in an embodiment may fall under the umbrella of what are usually termed unsupervised machine-learning. Results of these types of unsupervised learning algorithms may leave some room for interpretation, and do not, necessarily or inherently, provide outputs that are optimized when the domain or context in which they are being applied are taken into account. Consequently, to mitigate some of these issues and to optimize the use of the peer groups and identity graphs in an identity governance context, embodiments of identity management systems employing such peer groups of identities or entitlements using an identity graph may allow some degree of user configuration, where at a least a portion of the user configuration may be applied in the graph determination, peer-grouping or optimization of such peer group determination.

This configurability may allow the user of an identity management system to, for example, impose some constraints or set up certain configuration parameters for the community-detection (or other peer grouping) algorithm in order to enhance the clustering results for a particular use-case or application. A few non-exhaustive examples of user configuration are thus presented. A user may have a strongly defined concept of what constitutes a 'peer'. This may entail that the user's specification of what continues a peer may be used to derive a pruning threshold with statistical methods (e.g., rather than relying on modularity).

As another example of configurability, a user may elect to opt for a hierarchical clustering output, or that peer groups should have certain average size, which may entail to allowing for several consecutive iterations of the community-detection algorithm to be performed (as will be explained in more detail herein). A user may also elect to run the peer grouping per certain portions of the identities or entitlements, versus running it for all identities or entitlements. The filtered population of identities or entitlements may be specified in terms of geographic location, business role, business unit, etc. Similarly, a user may elect to filter the outputs of the community-detection algorithm in terms of certain identity or entitlement attributes, e.g., identity role, identity title, identity location, etc. The results might then be quantitatively and qualitatively contrasted against existing governance policies to measure, assess and certify compliance with these policies.

Generally then, a user may elect to utilize the peer grouping feature in combination with other tools of identity governance, in order to gain more insight into the quality of identity governance policy enforcement within the business. This entails that peer grouping should be configurable and flexible enough to allow it to be paired with other (e.g., third-party) identity management tools. Accordingly, certain restrictions may be imposed on the identity graph's or peer group's size, format, level of detail, etc.

In any event, once the peer groups of identities or entitlements of the pruned identity graph are used to cluster the identities into peer groups of identities at step 240 the determined peer groups can then be stored (e.g., separately or in the identity graph itself) and used by the identity management system. For example, each peer group (e.g., or identities or entitlements) may be assigned a peer group identifier and the peer group identifier associated with each identity assigned to the peer group by storing the peer group identifier in association with the node in the graph representing that identity or entitlement.

As an example of use a visual representation of the graph, the identities, entitlements or the peer groups in the identity graph may be presented to a user of the identity management to assist in compliance or certification assessments or evaluation of the identities and entitlements as currently used by the enterprise. In principle, strictly enforced pre-existing governance policies should ensure that identities with strongly similar access privileges are strongly similar (e.g., are in the same peer group). The presentation of such peer groups may thus, for example, allow an auditor or compliance assessor to quantitatively and qualitatively assess the effectiveness of any applicable pre-existing polices, or lack thereof, and how strictly they are enforced.

During such collection, graph determination and peer grouping steps, in certain embodiments, a number of efficiencies may be implemented to speed the collection process, reduce the amount data that must be stored and to reduce the computer processing overhead and computing cycles associated with such data collection, graph determination and peer grouping of such data. Specifically, in one embodiment, a delta change assessment may be performed when identity management data is collected or peer groups are determined in a current time period. More specifically, if identity management data was collected in a previous time period, or a previous peer grouping has been performed on identities or entitlements of a previously created identity graph, an assessment can be made (e.g., by a data querying script or process) of the difference (or delta) between the set of identities or entitlements corresponding to the most recent previous snapshot and the set of identities or entitlements obtained in the current time period. This assessment may comprise a determination of how many changes to the identities, associated entitlements or other attributes have occurred between the time of the previous snapshot and the current snapshot (e.g., the most recently identity management data collected in the current time period).

An assessment may also be made of the difference between the peer groups determined from the most recent previous snapshot and the peer groups obtained in the current time period. This assessment may comprise a determination of how many identities or entitlements are associated with different peer groups (e.g., relative to the peer grouping of identities or entitlements determined from the previous most recent snapshot), changes to the identities or entitlements or how many new identities are associated with an established (or new) peer group.

If there are no determined changes, or the changes are below some threshold number, or are few, local, or insignificant to a large majority of existing peer groups, then no action is needed other than updating the affected identities or entitlements in the data of the previous snapshot or the identity graph. New entries in the entries comprising the current snapshot of identities or entitlements may be created for any newly identified identities or entitlements. Additionally, nodes in the graph corresponding to new identities or entitlements can be appended to an appropriate peer group based on how similar this new identity to existing peer groups, (e.g., assign the new identity the peer group of the same department/title).

If the differences (e.g., number of changes, new identities, different peer group assignments, etc.) are non-trivial, affecting a multitude of identities across peer groups, then a new peer grouping process may occur on the newly refreshed data. In such case, a detection algorithm may be used to evolve, and persist, previously determined peer groups into their recent counterparts. This can be done by monitoring certain 'marker' identities, e.g., influencers, or identities with high centrality values and/or high degree of connections, in both versions of peer groups. Utilizing a majority vote approach, it can be determined how previous peer groups evolve into newer ones. Expected updated versions of the previous peer group, include splitting, merging, growth, shrinkage. Newer split peer groups may, for example inherit the 'old' peer group identifiers.

Embodiments of such a delta detection and updating mechanisms may have the further advantage of allowing the quality and stability of each peer group to be monitored by an identity management system via tracking the peer groups or identity graph, the changes thereto, or their evolution over time. By actively monitoring and assessing the degree of these changes between two or more consecutive versions of a peer group or identity graph, deteriorating quality issues may be detected as they arise or manifest in the identity graph or peer groups determined therefrom. Similarly, using the identity graphs, peer groups or peer group assessment metrics determined therefrom, a graph evolution model may be built in certain embodiments, (e.g., based on epidemiology susceptible, infected and recovered type models). Comparing the observed evolution of identities, entitlements or peer groups versus theoretical predictions may provide another tool to warn users of an identity management system against rapid or extreme changes that may negatively impact the quality of peer groups or identity management more generally.

Again, once the peer groups of identities or entitlements are determined from the pruned identity graph and stored (at step 240), a peer group assessment metric may be determined based on the identity graph or the determined peer groups at step 250. As discussed, this peer group assessment metric may be determined separately based on the peer groups or identity graph determined, or may be metric utilized by a community-detection algorithm, such that the peer group assessment metric may be determined as part of the peer group determination process. In certain embodiments then, the application of a community-detection algorithm may result in such a peer group assessment metric (e.g., modularity, evolving topology, connected components, centrality measures e.g., betweenness, closeness, community overlap measures (e.g., NMI, Omega indices)) that may be used as a peer group assessment metric may be utilized.

For example, as discussed above the Louvain algorithm may be a graph-based modularity optimized community-detection algorithm. Thus, a modularity associated with the determined peer groups may result from the determination of the peer group using the Louvain algorithm. Modularity is a scalar that can be determined for a graph or groups or subgraphs thereof and reflects a likelihood of the clusters generated (e.g., by the algorithm) to not have been generated by random chance. A high modularity value, (e.g., positive and away from 0) may indicate that the clustering result is unlikely to be a product of chance. This modularity can be used as a peer group assessment metric in one embodiment.

Accordingly, in certain embodiments, the clustering of identities or entitlements into peer groups may be optimized based on this peer group assessment metric. Specifically, a feedback loop may be utilized to determine the optimal pruning threshold. The optimization loop may serve to substantially increase or maximize the quality of the graph clustering, with respect to certain proper metrics (e.g., graph modularity or other peer group assessment metric). Additional domain-specific, per enterprise, criteria may be utilized in this step in certain embodiments in order to render clustering results that accurately reflect certain requirements to better serve a particular enterprise or use of the peer groups or identity graph.

For instance, in one embodiment if the peer group assessment metric is above (or below) a quality threshold at step 260 the determination of peer groups of identities or entitlements for the obtained in the current snapshot may end at step 262. The determined peer groups of identities or entitlements can then be stored (e.g., separately or in the identity graph) and used by the identity management system.

However, if the peer group assessment metric is below (or above) a quality threshold at step 260 a feedback loop may be instituted whereby the pruning threshold is adjusted by some amount at step 270 (up or down) and the originally determined identity graph is again pruned based on the adjusted pruning threshold (or the previously pruned identity graph may be further pruned) at step 230. The adjustment of the pruning threshold may be based on a wide variety of criteria in various embodiments and may be adjust be a fixed or differing amount in every iteration through the feedback loop. Additionally, in some embodiments, various machine learning techniques (e.g., unsupervised machine learning techniques such as k-means, method of moments, neural networks, etc.) may be used to determine an amount to adjust the pruning threshold or a value for the adjusted pruning threshold). This newly pruned identity graph can then be clustered into new peer groups of identities or entitlements at step 240 and a peer group assessment metric determined at step 250 based on the newly pruned identity graph or the newly determined peer groups.

If this new peer assessment metric is now above (or below) the quality threshold at step 260 the feedback loop may be stopped and the determination of peer groups of identities or entitlements for the data obtained in the current snapshot may end at step 262. These peer groups of identities or entitlements can then be stored (e.g., separately or in the identity graph) and used by the identity management system.

Otherwise, the feedback loop may continue by again adjusting the pruning threshold further at step 270 (e.g., further up or further down relative to the previous iteration of the feedback loop), re-pruning the identity graph based on the adjusted pruning threshold at step 230, clustering this newly pruned graph at step 240, determining another peer group assessment metric at step 250 and comparing this metric to the quality threshold at step 260. In this manner, the feedback loop of adjustment of the pruning threshold, re-pruning the graph and re-clustering the identity graph into peer groups may be repeated until the peer group assessment metric reaches a desired threshold. Moreover, by tailoring the peer group assessment metric and quality threshold to include or reflect domain or enterprise specific criteria (e.g., which may be specified by a user of the identity management system), the clustering results (e.g., the peer groups resulting from the clustering) may more accurately reflect particular requirements or the needs of a particular enterprise or be better tailored to a particular use.

Once the feedback loop is ended (step 262) the determined peer groups of identities or entitlements can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric (e.g., steps 230, 240, 250, 260 and 270) may all be performed the same or differently when clustering the identity or entitlements of the entitlement graph. More generally, then, the pruning and clustering of the identity nodes of the identity graph may be performed separately from the pruning and clustering of the entitlement nodes of the identity graph. In certain embodiments, for example, the pruning and clustering (e.g., steps 230, 240, 250, 260 and 270) of the identity nodes of the identity graph may be performed as a separate process from the pruning and clustering (e.g., steps 230, 240, 250, 260 and 270) of the entitlement nodes of the identity graph. Accordingly, the identity graph may comprise at least two subgraphs, the identities subgraph comprising at least the identity nodes and edges between these identity nodes and the entitlement subgraph comprising at least the entitlement nodes and edges between those entitlement nodes.

It may now be helpful to look at such visual depictions and presentations of identity graphs or interfaces that may be created or presented based on such identity graphs. It will be apparent that these depictions and interfaces are but example of depictions and interfaces that may presented or utilized, and that almost any type of presentation, depiction or interface based on the identities, entitlements, peer groups or other associated data discussed may be utilized in association with the embodiments of identity management systems disclosed herein.

As discussed, embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity or two nodes representing an entitlement, as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities or entitlements may be determined using the weights of the relationships in the identity graph.

Specifically, in certain embodiments, a property graph may be thought of as a graph comprising a number of interrelated nodes. These nodes may include nodes that may have labels defining the type of the node (e.g., the type of "thing" or entity that the node represents, such as an identity, entitlement or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarty", or the like.

The nodes of the property graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 3A:
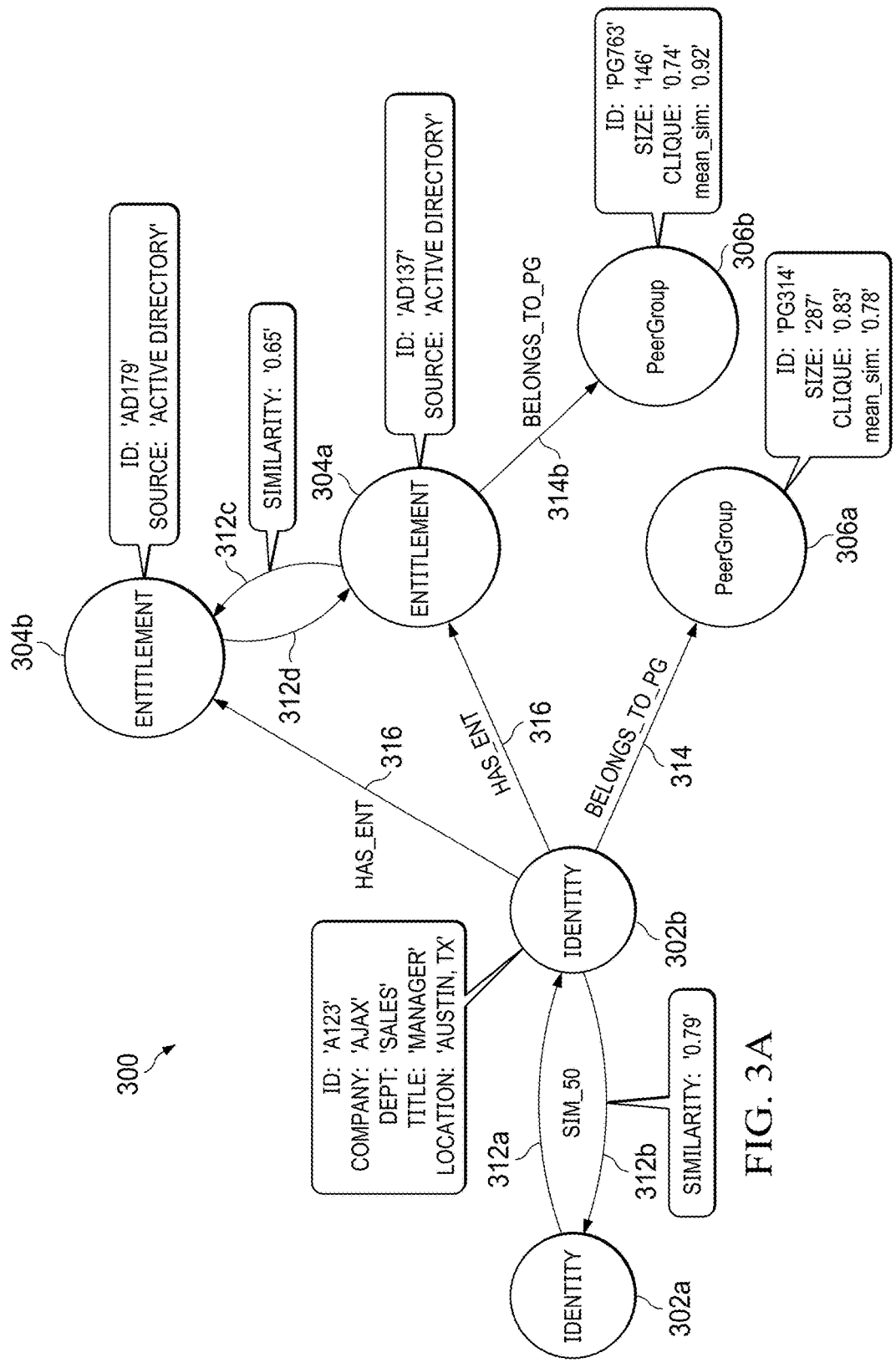
FIGS. 3A, 3B, 3C, 3D and 3E depict example visual representations of identity graphs.

Referring then to FIG. 3A, a graphical depiction of a portion of an example identity graph 300 is depicted. Here, nodes are represented by circles and relationships are represented by the directional arrows between the nodes. Such an identity graph 300 may represent identities, entitlements or peer groups, their association, and the degree of similarity between identities represented by the nodes. Thus, for example, the identity nodes 302a, 302b have the label "Identity" indicating they are identity nodes. Identity node 302b is shown as being associated with a set of properties that define the attributes or data of that identity node 302b, including here that the "id" of identity node 302b is "a123", the "company" of identity node 302b is "Ajax", the "dept" of identity node 302b is "Sales", the "title" of identity node 302b is "Manager", and the "location" of identity node 302b is "Austin, Tex.".

These identity nodes 302 of the identity graph 300 are joined by edges formed by directed relationships 312a, 312b. Directed relationship 312a may represent that the identity of identity node 302a is similar to (represented by the labeled "SIM" relationship 312a) the identity represented by identity node 302b. Similarly, directed relationship 312b may represent that the identity of identity node 302b is similar to (represented by the labeled "SIM" relationship 312b) the identity represented by identity node 302a. Here, relationship 312b has been assigned a similarity weight of 0.79. Notice that while these relationships 312a, 312b are depicted as individual directional relationships, such a similar relationship may be a single bidirectional relationship assigned a single similarity weight.

Entitlement nodes 304a, 304b have the label "Entitlement" indicating that they are entitlement nodes. Entitlement node 304a is shown as being associated with a set of properties that define the attributes or data of that entitlement node 304a, including here that the "id" of entitlement node 304 is "ad137", and the "source" of entitlement node 304a is "Active Directory". Entitlement node 304b is shown as being associated with a set of properties that define the attributes or data of that entitlement node 304b, including here that the "id" of entitlement node 304b is "ad179", and the "source" of entitlement node 304a is "Active Directory".

These entitlement nodes 304 of the identity graph 300 are joined by edges formed by directed relationships 312c, 312d. Directed relationship 312c may represent that the entitlement node 304a is similar to (represented by the labeled "SIM" relationship 312c) the entitlement represented by entitlement node 304b. Similarly, directed relationship 312d may represent that the entitlement of entitlement node 304b is similar to (represented by the labeled "SIM" relationship 312d) the entitlement represented by entitlement node 304a. Here, relationship 312c has been assigned a similarity weight of 0.65. Notice that while these relationships 312c, 312d are depicted as individual directional relationships, such a similar relationship may be a single bidirectional relationship assigned a single similarity weight.

Identity node 302b and entitlement nodes 304a, 304b of the identity graph 300 are joined by edges formed by directed relationships 316, 316. Directed relationships 316 may represent that the identity of identity node 302b has (represented by the labeled "HAS_ENT" relationships 316) the entitlements represented by entitlement nodes 304a, 304b.

Peer group node 306a has the label "PeerGroup" indicating that it is a peer group node. Peer group node 306a is shown as being associated with a set of properties that define the attributes or data of that peer group node 306a, including here that the "id" of peer group node 306a is "pg314", the "size" of peer group node 306a is "287", the "clique" of peer group node 306a is "0.83" and the "mean_sim" or mean similarity value of peer group node 306a is "0.78". Identity node 302b and peer group node 306a of the identity graph 300 are joined by an edge formed by directed relationship 314a. Directed relationship 314a may represent that the identity of identity node 302b belongs to (represented by the labeled "BELONGS_TO_PG" relationship 314a) the peer group represented by peer group node 306a.

Peer group node 306b has the label "PeerGroup" indicating that it is a peer group node. Peer group node 306b is shown as being associated with a set of properties that define the attributes or data of that peer group node 306b, including here that the "id" of peer group node 306b is "pg763", the "size" of peer group node 306b is "146", the "clique" of peer group node 306b is "0.74" and the "mean_sim" or mean similarity value of peer group node 306b is "0.92". Entitlement node 304a and peer group node 306b of the identity graph 300 are joined by an edge formed by directed relationship 314b. Directed relationship 314b may represent that the identity of entitlement node 304a belongs to (represented by the labeled "BELONGS_TO_PG" relationship 314b) the peer group represented by peer group node 306b.

Figure 3B:
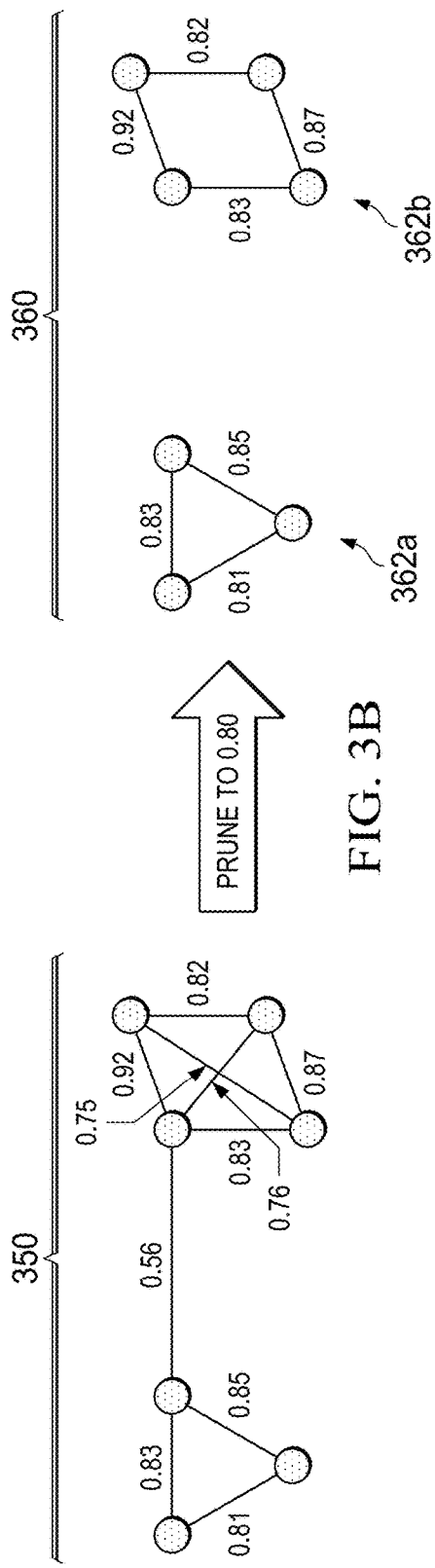

FIG. 3B is a graphical depiction of an entitlement graph and the subgraphs or clusters that may result from different pruning thresholds. In particular, entitlement graph 350 may be an initial cluster of entitlement nodes with edges having similarity weights (e.g., which may be determined as discussed) where the entitlement graph has been pruned initially and clustered according to a 0.5 pruning threshold for the similarity weight. Entitlement graph 360 is a result of pruning the entitlement graph 350 according to a higher pruning threshold of 0.8 and clustering. Here, two subgraphs 362a, 362b may result from such a pruning.

Figure 3C:
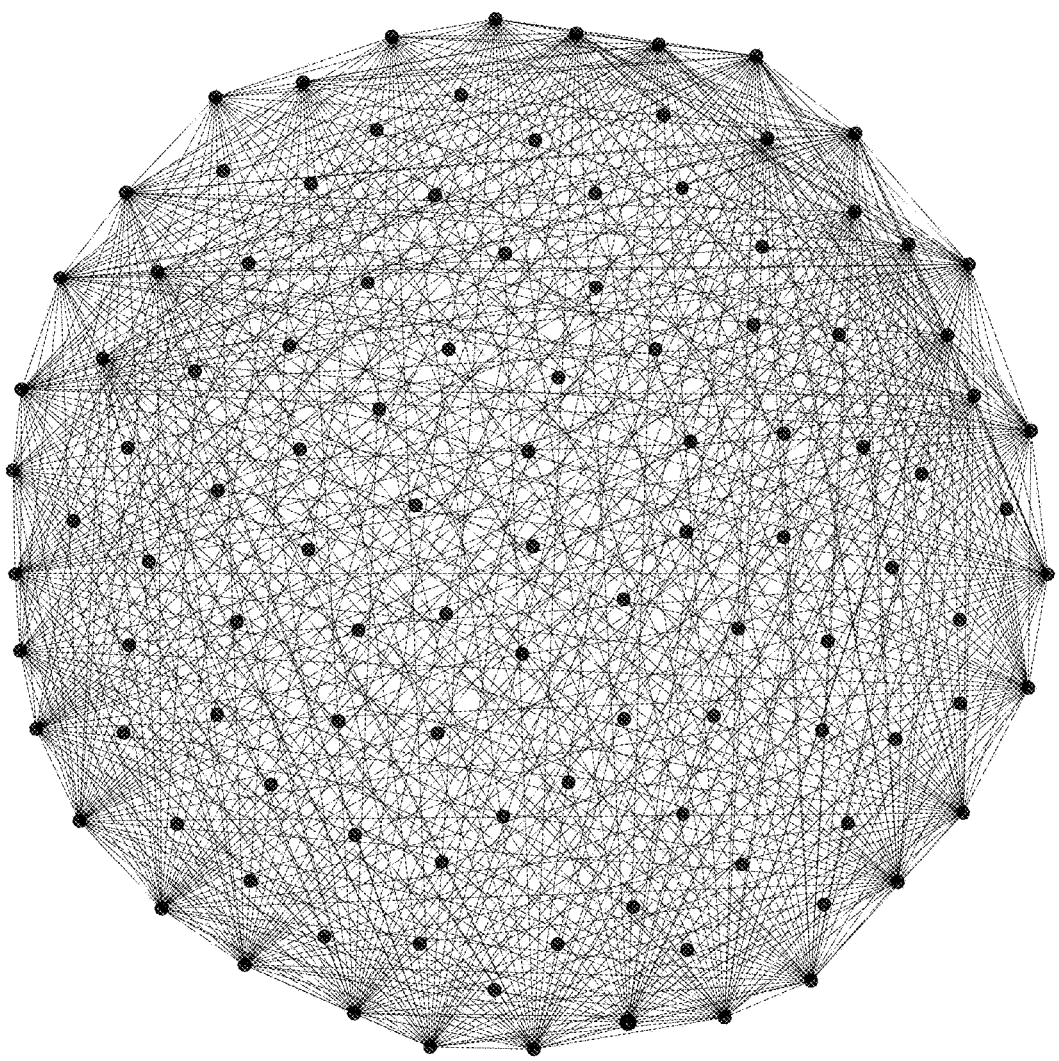
Figure 3D:
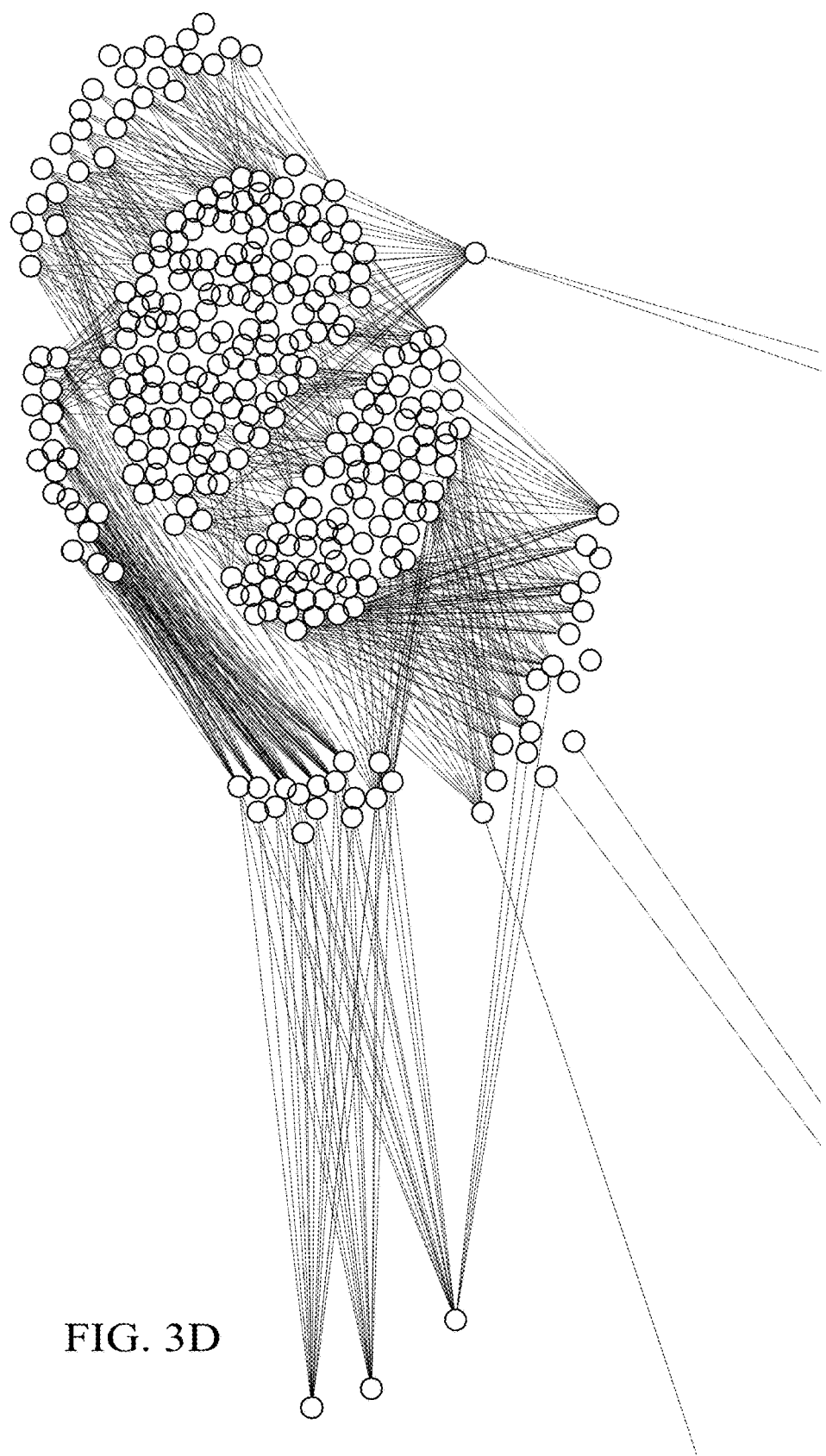
Figure 3E:
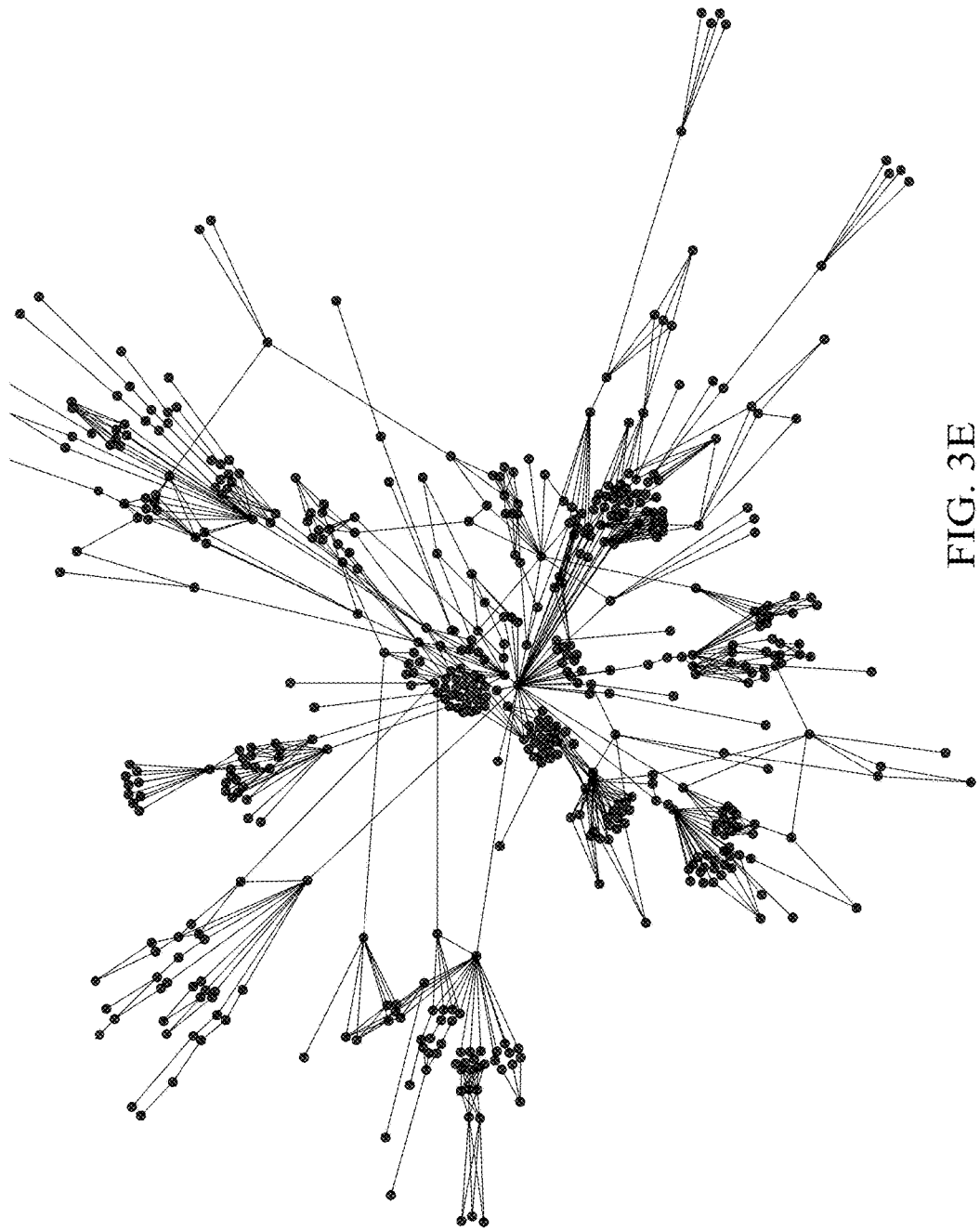

Now referring to FIGS. 3C, 3D and 3E, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing.

Figure 4:
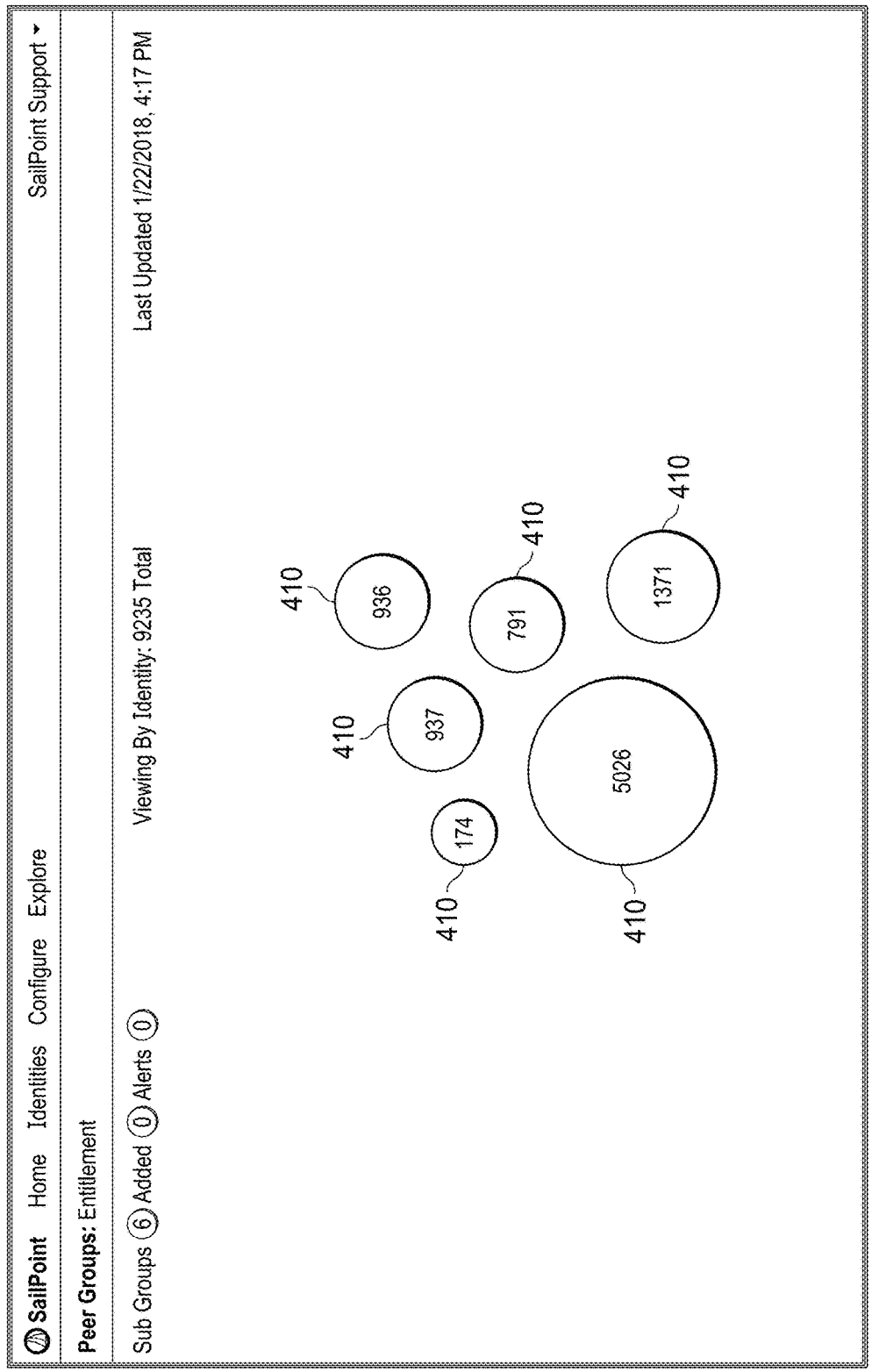
FIGS. 4-7 depict interfaces that may be utilized by embodiments of an identity management system.

FIG. 4 depicts an embodiment of an interface that may be utilized by an identity management system to visually present data regarding the peer groups determined for identities within an enterprise. In this example, the enterprise has 9235 associated identities, and the interface depicts that there are 6 peer groups of those identities that have been determined based on the entitlements associated with the identities. Each of the depicted circles 410 within the interface represents one of the peer groups and displays the number of identities associated with each of those peer groups. Moreover, the size and location of each circle 410 may depict the relative size of the peer groups of the identities and the number of entitlements shared between those peer groups, or identities within those peer groups.

Figure 5:
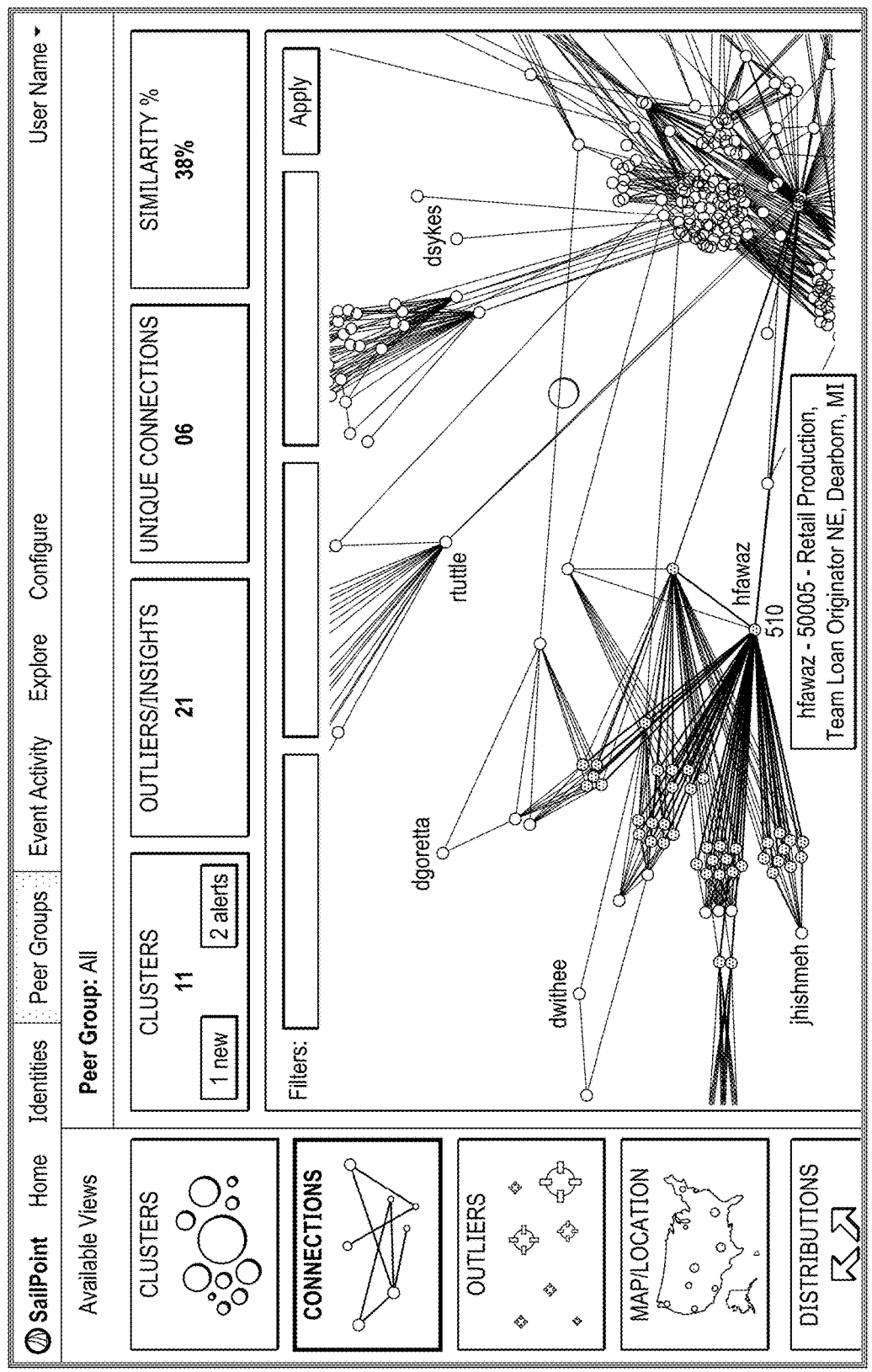

FIG. 5 depicts an embodiment of interface that may be utilized by an identity management system to visually present data regarding the peer groups determined for identities within an enterprise. Here, the interface may present a visual representation of the identity graph as discussed above where each identity node is represented by a circle and each edge is represented by a line joining the nodes, where the closer the nodes the higher the similarity value between the nodes. The interface may also present information regarding the number of peer groups (clusters) determined for the identity graph being presented (in this example 11).

The interface, or a portion thereof, may allow the user to navigate around the identity graph and "drill down" to obtain information on a represented node or entitlement. In the depicted example, the user has hovered above a node 510 of the identity graph and information about that identity is presented through the interface to the user. By looking at such an identity graph a user may be able to discern, for example, which identities which may be "highly contagious" or represent other identity management risks or compliance issues. An identity may be "highly contagious" or otherwise represent an identity governance risk, for example, if that identity may have a number or type of entitlement such that if those identities are replicated without identity governance oversight (e.g., assigned to other users) it may cause identity governance issues such as unintended entitlement bloom.

Figure 6:
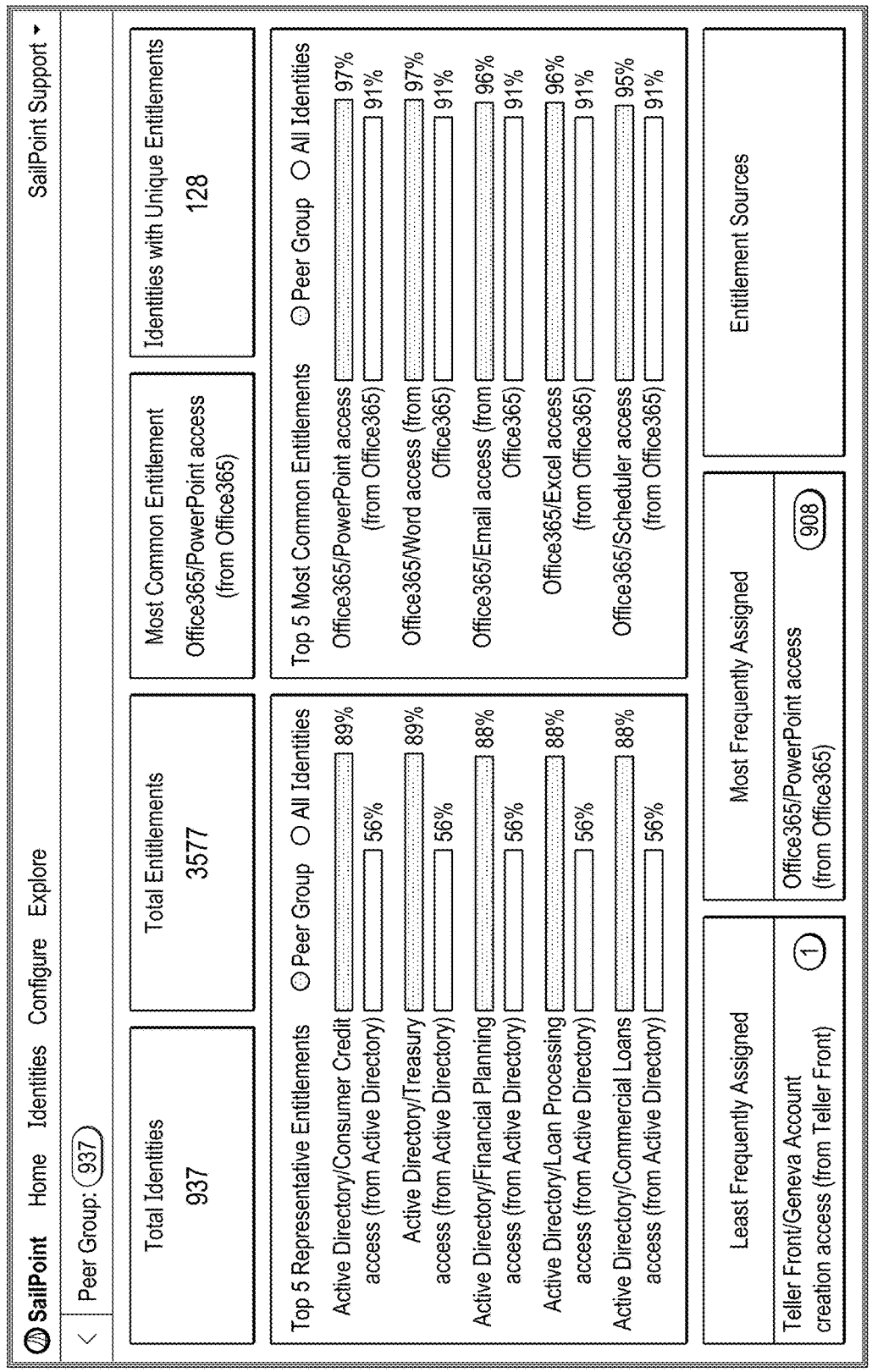

FIG. 6 depicts an embodiment of another interface that may be utilized by an identity management system to visually present data regarding the peer groups determined for identities within an enterprise. In this example, the interface can present data regarding a particular peer group determined for an identity graph, showing, for example, the number of identities within that peer group, what the entitlements are within that peer group, what identities share those entitlements, or why those identities have been grouped together. The interface may also present a wide variety of other data regarding that peer group or identities or entitlements within that (or other) peer groups, including for example, how that peer group, identities within that peer group or other entitlements relate to each other or other determined peer groups, identities or entitlements of the enterprise. Thus, a user viewing such an interface may be able to ascertain reasons why the identities have been grouped and explore for outliers and see entitlements that these identities have in common with each other, as well as how different they are from the rest of the identities and entitlements of an enterprise. Moreover, the user may also "drill down" for more details to discover which identities included and the entitlements assigned.

Figure 7:
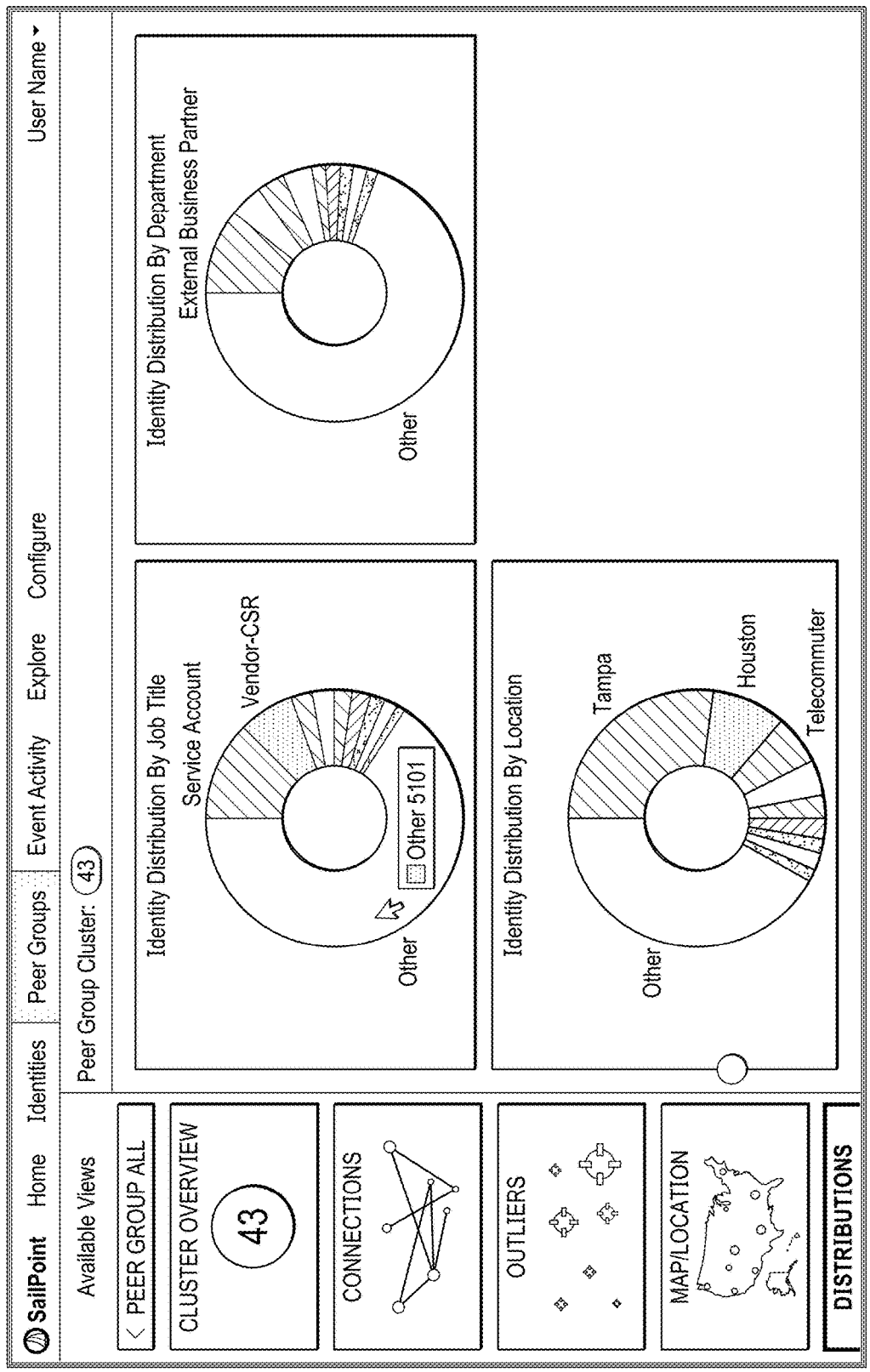

FIG. 7 depicts an embodiment of still another interface that may be utilized by an identity management system to visually present data regarding the peer groups determined for identities within an enterprise. In this example, the interface can present data regarding a particular peer group (e.g., peer group 43) determined for an identity graph, showing, for example, distributions of identities within the peer group, such as the identities of the peer group's correlation with departments, location or job title.

It will now be recalled from the discussions above, that what is desired in the context of identity governance solutions as discussed herein, is an improved decision support agent that can be used to recommend approval or denial for an access request (e.g., an identity entitlement pair) that may be applied easily and substantially in real-time in bulk to a large number of these access requests without loss of accuracy or efficacy.

To that end, among others, attention is now directed to the embodiments of intelligent decision support agents and artificial intelligence based identity governance systems including such agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data, in other words, historical data on whether past access requests have been approved or denied.

In particular, in certain embodiments, the intelligent agent may enhance the obtained historical certification data by determining data for features (e.g., predictors) which represent relevant signals to the approval or denial decision. Some of these features may include primary features that may be determined based on the historical certification data and associated identity governance data. Other features may be determined from the result of intensive artificial intelligence based data analysis performed by the artificial intelligence based identity governance system. These features may be associated with, for example, a network graph utilized to peer group the identities of the distributed networked enterprise computing environment.

This enhanced data can then be used to train and deploy the classifier. When an access request is submitted to the intelligent agent, the data enhancer may be used to determine equivalent features associated with the submitted access request. The intelligent agent can then apply the trained classifier to the submitted access request (with the associated features) to obtain an approval or denial recommendation and return such a recommendation to a user.

In some cases, to obtain an accurate and useful classifier, a relatively large training dataset (e.g. thousands of historical access requests and associated approval or denials) with a high signal-to-noise ratio (e.g. with sizeable and identifiable patterns that are highly correlated with the value of the approval or denial decision) may be desired. Accordingly, there may be instances where an insufficient amount of training data has been obtained by the intelligent agent or the classifier is not otherwise trained or fully utilizable. It may still be desired, however, to provide an approval or denial recommendation when an access request is submitted to the intelligent agent.

It will now be recalled from the discussions above, that what is desired in the context of identity governance solutions as discussed herein, is an improved decision support agent that can be used to recommend approval or denial for an access request (e.g., an identity entitlement pair) that may be applied easily and substantially in real-time in bulk to a large number of these access requests without loss of accuracy or efficacy. Embodiments of artificial intelligence identity management system as disclosed herein may thus utilize embodiments of intelligent decision support agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data, in other words, historical data on whether past access requests have been approved or denied.

In particular, in certain embodiments, the intelligent agent may enhance the obtained historical certification data by determining data for features or predictors which represent relevant signals to the approval or denial decision. Some of these features may include primary features that may be determined based on the historical certification data and associated identity governance data. Other features may be composite features generated, synthesized or otherwise determined from the result of intensive artificial intelligence based data analysis performed by the artificial intelligence based identity governance system. These features may be associated with, for example, an identity graph utilized to peer group the identities of the distributed networked enterprise computing environment.

This enhanced data can then be used to train and deploy the classifier. When an access request is submitted to the intelligent agent, the data enhancer may be used to determine values for those features (e.g., the features used to train the classifier) associated with the submitted access request. The intelligent agent can then apply the trained classifier to the submitted access request (with the associated features) to obtain an approval or denial recommendation and return such a recommendation to a user.

Referring to FIG. 8, a distributed networked computer environment including an identity management system with one embodiment of an intelligent agent is depicted. As discussed above, the networked computer environment may include an enterprise computing environment 800 including a number of computing devices or applications that may be coupled over a computer network 802 or combination of computer networks. Enterprise environment 800 may thus include a number of resources, various resource groups and users associated with an enterprise. Users may have various roles, job functions, responsibilities, etc. to perform within various processes or tasks associated with enterprise environment 800.

Users may access resources of the enterprise environment 800 to perform functions associated with their jobs, obtain information about enterprise 800 and its products, services, and resources, enter or manipulate information regarding the same, monitor activity in enterprise 800, order supplies and services for enterprise 800, manage inventory, generate financial analyses and reports, or generally to perform any task, activity or process related to the enterprise 800. Thus, to accomplish their responsibilities, users may have entitlements to access resources of the enterprise environment 800. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 800 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 800 which may shift, change, evolve, etc. leaving entitlements non optimally distributed among various users.

To assist in managing the entitlements assigned to various users and more generally in managing and assessing access risks in enterprise environment 800, an identity management system 850 may be employed. Such an identity management system 850 may allow an administrative or other type of user to define one or more identities and one or more entitlements and associate these identities with entitlements using, for example, an administrator interface 852. Examples of such identity management systems are Sailpoint's IdentityIQ and IdentityNow products. Note here, that while the identity management system 850 has been depicted in the diagram as separate and distinct from the enterprise environment 800 and coupled to enterprise environment 800 over a computer network 804 (which may the same as, or different than, network 802), it will be realized that such an identity management system 850 may be deployed as part of the enterprise environment 800, remotely from the enterprise environment, as a cloud based application or set of services, or in another configuration.

An identity may thus be almost physical or virtual thing (e.g., entity), place, person or other item that an enterprise would like to define. An entitlement may be the ability to perform or access a function within the distributed networked enterprise computer environment 800, including, for example, accessing computing systems, applications, file systems, particular data or data items, networks, subnetworks or network locations, etc. Each of these identities may therefore be assigned zero or more entitlements with respect to the distributed networked computer environments.

The identity management system 850 may thus store identity management data 854. The identity management data 854 stored may include a set entries, each entry corresponding to and including an identity (e.g., alphanumerical identifiers for identities) as defined and managed by the identity management system, a list or vector of entitlements (e.g., alphanumeric identifiers for entitlements) assigned to that identity by the identity management system, and a time stamp at which the identity management data was collected from the identity management system. Other data could also be associated with each identity, including data that may be provided from other systems such as a title, location or department associated with the identity.

Collectors 856 of the identity management system 850 may thus request or otherwise obtain data from various touchpoint systems within enterprise environment 800. These touchpoint systems may include, for example Active Directory systems, Java Database Connectors within the enterprise 800, Microsoft SQL servers, Azure Active Directory servers, OpenLDAP servers, Oracle Databases, SalesForce applications, ServiceNow applications, SAP applications or Google GSuite.

Accordingly, the collectors 856 of the identity management system 850 may obtain or collect event data from various systems within the enterprise environment 800 and process the event data to associate the event data with the identities defined in the identity management data 854 to evaluate or analyze these events or other data in an identity management context. As part of a robust identity management system, it is desirable to analyze the identity management data 854 associated with an enterprise 800. Accordingly, an identity management system 860 may include a harvester 862 and a graph generator 864. The harvester 862 may obtain identity management data 854 from one or more identity management systems 850 associated with enterprise 800. Graph generator 864 may generate a peer grouped identity graph from the obtained identity management data 854 and store the identity graph in graph data store 866. An interface 868 of the identity management system 860 may use the identity graph in the graph data store 866 or associated peer groups to present one or more interfaces which may be used for risk assessment, as has been discussed.

Additionally, a user may interact with the identity management system 850 through a user interface 858 to access or manipulate data on identities, entitlements, events or generally perform identity management with respect to enterprise environment 800. As but one example, enterprises are often required by regulatory agencies or for other reasons, to conduct what is known as a certification campaign. Typically, during a certification campaign, a manager or an access entitlement owner is required to certify tens if not hundreds or thousands of identities for most, if not all, the access entitlements held by these identities. In other words, the manager or an access entitlement owner may be presented with a identity and an associated entitlement (i.e., an access request) and asked to approve or deny the assignment of the entitlement to the identity. Similarly, a manager or an access entitlement owner may be asked to evaluate access requests to approve or deny a particular entitlement to an identity.

These access requests (e.g., an identity and entitlement pair) may thus be presented to a user (e.g., a manager or an access entitlement owner) of the identity management system 850 through the user interface 858. The user interface 858 can be used by the user to approve or deny the access request. If the access request is approved, the entitlement may be associated with the identity in the identity data 854. Moreover, the identity management system 850 can maintain a set of historical certification data 874 associated with past certification campaigns or access requests. The historical certification data 874 may include a set of access requests (e.g., entitlement and identity pairs), where each access request may be associated with an approval or denial decision (e.g., whether the access request was approved or denied by the user through the interface 858) and a time (e.g., timestamp) when the approval or denial of the access request (or campaign) occurred.

As discussed previously, it is desired in identity governance solutions to provide a decision support agent that can be used to recommend approval or denial for an access request (e.g., an identity and entitlement pair) that may be applied easily and substantially in real-time in bulk to a large number of these access requests without loss of accuracy or efficacy. Accordingly, embodiments of identity management system 850 may provide a decision support tool through the user interface 858. In this manner, when a user is presented with one or more access requests through the user interface 858 (e.g., during a certification campaign or the like), the user may indicate through the user interface 858 that a recommendation is desired. An approval or denial recommendation can then be determined and presented to the user through the decision support tool of user interface 858.

To provide such a decision support recommendation tool, identity management system 860 may include intelligent agent 880. Intelligent agent 880 may include an interface 882. When a request for a recommendation for one or more access requests is received from the user through the user interface 858, a request to determine a recommendation for each of those access requests can be submitted to the intelligent agent from the identity management system 850 (e.g., or user interface 858 or other component of identity management system 850) through the interface 882, where the request may include the access requests (e.g., identity and entitlement pair). The intelligent agent 880 can accurately determine recommendations for approval or denial on a case-by-case basis, but at the same time may be adapted to apply these decisions in bulk. Note here, that while the identity management system 850 has been depicted in the diagram as separate and distinct from the identity management system 860 and coupled to identity management system 860 over a computer network 804, it will be realized that such an identity management system 850 and identity management system 860 may be deployed as part of the same identity management system or different identity management system, as a cloud based application or set of services, or in another configuration entirely.

To determine an approval or denial recommendation for one or more access requests, intelligent agent 880 may include classifier module 870. Classifier module 870 may, in turn, include a classifier builder 874 for training a classifier 878 based on a set of features associated with historical certification data. This classifier 878 may include a machine-learning classifier (or model) trained on the features that is adapted to detect existing patterns in the data and 'learn' the underlying rules to enable it to make an accurate recommendation on an access request.

As such, when a request for recommendations for one or more access requests are received through the intelligent agent interface 882, the intelligent agents 880 may submit these access requests to the classifier module 870 in a request for a recommendation through the classifier interface 872. The classifier module 870 can then determine a set of features for each access request corresponding to the features used to train classifier 878. For each access request, the access request and associated features can then be submitted to (or used to query) the classifier 878. The classifier 878 will then return an approval or denial decision for that access request. The approval or denial recommendation for each access request can then be returned through the classifier interface 872 to the intelligence agent 880 which returns the approval or denial recommendation for each access request to the initial request from the identity management system 850 where these approval or denial recommendations can be returned through the decision support tool of the user interface 858.

To create embodiments of such a classifier 878, it may need to be trained on a dataset comprised of 'features' or 'predictors' which represent relevant signals to an approve/deny decision. Thus, the training data used the classifier builder 874 may be a set of historical certification data, comprising a set of access request (e.g., identity and entitlement pairs) along with a set of features associated with that access request and the historical approval or denial decision for that access request. This historical certification data may, for example, be represented as set of rows in a table, each row corresponding to a historical access request decision and including values for the associated set of features as is depicted above. As may be realized, a careful feature selection and generation process may be utilized to make sure a consistent and highly relevant data set is produced. An accurate classifier may require a sufficiently large training dataset with a high signal-to-noise ratio, (e.g., with sizeable and identifiable patterns that are highly correlated with the value of the 'label', i.e. the approve/deny decision). Given that such dataset relies on prior historical certification and/or access request events, great care has to be exercised to make sure that the values of any of the predictor columns are correctly synced with the corresponding decision.

To determine values for features that may be utilized in training classifier 878 (and in submitting access requests to classifier 878 for an approval or denial recommendation) intelligent agent 880 may also include data enhancer 820. Accordingly, when classifier builder 874 is training classifier 874 it may request enhanced certification data 824 from the data enhancer 820 through the enhancer interface 822. The data enhancer 820 can retrieve the historical certification data 874 from the identity management system 850, and enhance this historical certification data 874 with one or more determined, generated or synthesize features (collectively determined composite features) not present in the original historical certification data 874. The resulting enhanced certification data 824 may thus include primary features—existing data that is harvested from the enterprise in association with historical certifications and stored in historical certification data 874, and composite features—data for features of an access request that can be determined by the data enhancer 820. These composite features may include features determined based on the identity graph as stored in graph data store 866 as discussed above.

Data enhancer 820 can thus obtain historical certification data from the identity management system 860. This data may include a set of access requests (e.g., entitlement identity pairs, where each entitlement or identity may be identified by a corresponding alphanumeric identifier) along with a historical approval or denial decision for that access request, a time stamp indicating when the approval or denial decision took place. The data enhancer 820 can reference identity data 854 to determine additional data associated with the identity and entitlement of each access request, including for example, a title, location, group or department associated with the identity, an identification of whether an entitlement is a privileged entitlement, or other data associated with the identity or entitlement. These features may, in turn, be used to determine values for other primary features.

In one embodiment, a primary features that may be determined for a given access request (e.g., an identity entitlement pair) may include the historical (e.g. over last 3, 6, 12 months or another time period) popularity or density of the given entitlement within the identity's department, group of common titles, location, or peer group as discussed above. Specifically, identity data 854 (or the identity graph) may be evaluated to determine all identities associated with some grouping associated with the identity of the access request. For example, all identities in that identity's department or location may be determined. As another example, the property graph may be queried to determine a peer grouping of the identity graph associated with the identity of the access request and all identities of that peer group determined. For all the identities for the given grouping (e.g., department, location, peer group, etc.), the percentage or other metric of identities within that group that have the entitlement of the access request can then be determined and associated with the access request as a value for that primary feature.

A primary feature that may be determined for a given access request may also include the trending (e.g. over the last 3, 6, 12 months or another time period) percentages of approvals or denials of the entitlement of the access request within the identity's department, group of common titles, location, or peer group as discussed above. Here, identity data 854 (or the identity graph) may be evaluated to determine all identities associated with some grouping associated with the identity of the access request. For example, all identities in that identity's department or location may be determined. As another example, the identity graph may be queried to determine a peer grouping of the identity graph associated with the identity of the access request and all identities of that peer group determined. For all the identities for the given grouping (e.g., department, location, peer group, etc.), the historical certification data 874 can be evaluated to determine any (historical) access requests for those identities that have approved or denied within the given time period (e.g., based on the time stamps associated with the access requests of the historical certification data 874). From this set of access requests in the historical certification data 874 the approval or denial data (e.g., decision) associated with each of these historical access requests for the grouping of identities may be used to determine the percentage of approval or denials and this percentage associated with the given access request as a value for that primary feature.

Other examples of primary feature that may be determined and associated with an access request are flags for specific attribute values or recent changes (e.g. is an identity have no historical certification data 874, how many times within a historical time period has the identity of the access request been certified for same entitlement, have any attributes or properties of the identity of the access request changed within a historical time period, have any attributes or properties of the identity of the access request changed within a historical time period (e.g. any recent entitlement privilege level changes). Other primary features that may associated with a given access request in the context of identity management may also be utilized and are fully contemplated herein.

In addition to the values for primary features for the set of access requests of the historical certification data 874, data enhancer 820 may also determine value for composite features for the historical access request. In one embodiment, one or more of these composite features may be determined based on the identity graph created by the identity management system 860. It will be noted here that the identities and entitlements of an enterprise may be quite fluid. Thus, the identity graph (which may be updated on a regular basis by the identity management system 860) may be quite fluid as well. As such, for those composite features for an access request determined from the identity graph it may be desired to determine such composite features using an identity graph from a contemporaneous time period (e.g., within a certain time threshold) of the access request. Accordingly, historical version of the identity graph may be stored in the graph data store 866. These historical versions of the identity graph may be separate property graphs or a property graph property may include past versions of the property graph by, for example, maintaining nodes or associated time stamps for when those nodes were created or changed. In this manner, when determining a composite feature for an access request, the time stamp associated with that access request in the historical certification data 874 may be determined, and a version (e.g., current or past version) of the identity graph may be obtained by querying the identity graph or identity graph store 866 with the time stamp associated with the access request to determine the version of the identity graph closest in time to the time stamp of the access request. This version of the identity graph may then be utilized when determining values for identity graph based composite features for that access request.

Specifically, in one embodiment, for an access request (e.g., an identity entitlement pair) these composite features determined by data enhancer 820 may include a shortest distance (e.g., as defined as the minimum number of edges from the given identity to the given entitlement in the identity graph stored in the graph data store 866). The property graph can thus be queried based on the identity of the access request to find the shortest distance to the node representing the entitlement of the access request. The shortest distance as determined from the property graph, in terms of the length of the shortest path(s) from the identity node to the entitlement node, may be associated with the given access request as a value for that composite feature. If there are no feasible paths from identity to the entitlement, or if the returned response is greater than a pre-determined threshold, for querying performance purposes, then the value for this feature may default to infinity or null.

Another composite feature for an access request may be the historical (e.g. over last 3, 6, 12 months or another time period) popularity or density of the given entitlement within the group of immediate peers to the given identity in the identity graph. A peer may be defined as identities with similarity relationship having a score over a certain threshold (e.g. with similarity weights 0.80 or higher). Thus, for this feature, the property graph may be queried with the identity of the access relationship to determine all identities having a similarity relationship to the given identity above the threshold. For all the determined peer identities, the percentage or other metric of identities within that group that have the entitlement of the access request can then be determined and associated with the access request as a value for this composite feature.

Similarly, a composite feature that may be determined for a given access request may also include the trending (e.g. over the last 3, 6, 12 months or another time period) percentages of approvals or denials of the entitlement of the access request within the group of immediate peers to the given identity in the identity graph. Here, the property graph may be queried with the identity of the access relationship to determine all identities having a similarity relationship to the given identity above the threshold. For all the identities that are immediate peers to the given identity, the historical certification data 874 can be evaluated to determine any (historical) access requests for those identities that have approved or denied within the given time period (e.g., based on the time stamps associated with the access requests of the historical certification data 874). From this set of access requests in the historical certification data 874, the approval or denial data (e.g., decision) associated with each of these historical access requests for the grouping of identities may be used to determine the percentage of approval or denials, and this percentage associated with the given access request as a value for the composite feature.

Other types of composite features, including those that are identity graph based may also be used. For example, certain flags for identity graph related attribute values or recent changes may be determined for an access request and included as values for composite features. These flags may indicate a value for a composite feature representing if the node representing the identity of the access request a singleton (no strong similarity to anyone) in the identity graph. Another flag for another composite feature may pertain to any recent identity graph changes associated with the identity or entitlement of the access request. Such as, if the identity has changed peer groups within a certain historical time period, if the entitlement of the access request had a change in associations (e.g., is associated with different roles) or if the entitlement of the access request a singleton or an outlier in the identity graph. Other composite features that may associated with a given access request in the context of identity management, including those that may be determined from an identity graph as discussed herein may also be utilized and are fully contemplated.

The below table list one example of historical certification data, where a row corresponds to an access request having an entitlement and identity pairs, along with data determined for a set of values for features and an approval or denial decision (here labeled as "response" where a value of "1" indicates approval and "0" indicated denial).

| identity_id | entitlement_id | certEnt12 Mon | approvalTitle12 Mon | approval Location12 Mon | density Department12 Mon | density Title12 Mon | density Location12 Mon | response |
|---|---|---|---|---|---|---|---|---|
| 8a84cb6f600f7 61501600fd1b ba01008 | 8a84cb706488adf a01648bcc960b5 90e | −1 | −1 | −1 | −1 | −1 | −1 | 1 |

-continued

| identity_id | entitlement_id | certEnt12 Mon | approvalTitle12 Mon | approval Location12 Mon | density Department12 Mon | density Title12 Mon | density Location12 Mon | response |
|---|---|---|---|---|---|---|---|---|
| 8a84cb6f600f7 61501600fd1d 9a81175 | 8a84cbe4479b22 e60147a7abea0a 1ed9 | −1 | −1 | −1 | −1 | −1 | −1 | 0 |
| 8a84cb6f600f7 61501600fd1e 1f511ce | 8a84cb70612fffd 401614f1ba5c755 d5 | −1 | −1 | −1 | −1 | −1 | −1 | 1 |
| 8a84cb6f600f7 61501600fd20 3291387 | 8a84cb70600f785 e01600fd58fd200 e6 | −1 | −1 | −1 | 3.09 | 3.85 | 2.18 | 0 |
| 8a84cb6f600f7 61501600fd25 38b17c0 | 8a84cb7060e567 c10160e820782e 4505 | −1 | −1 | −1 | 4.12 | 2.78 | 4.09 | 1 |

The enhanced certification data 824 determined and stored by the data enhancer 824 may thus include a set of (historical) access requests and associated time stamps, a decision associated with each access request (e.g., approval or denial) and for each access request values for a set of primary and composite features as discussed. Classifier builder 874 may utilize this enhanced certification data 824 to train the classifier 878. In one embodiment, for example, the classifier 878 may be an eXtreme Gradient (XG) Boost model implemented in the H2O machine learning platform. It will be apparent, however, that other classifiers may be utilized in association with embodiments herein, and similarly built on the features as disclosed herein without loss of generality.

Classifier builder 874 may thus execute as a triggered or scheduled service that queries the enhanced certification data 824 to form a data set of enhanced certification data 824 corresponding to the enterprise 800 and train the classifier 878 accordingly. Specifically, in one embodiment the classifier builder 874 may train an XGBoost classifier 878 by randomly splitting the enhanced certification data 824 into three parts or sets: training, validation, and testing, such that 80-90% of the data may be in the training set, 5% may be in the validation set and 15-5% of the data may be in the testing set. The classifier builder 878 may run the training process iteratively by observing patterns in data and making estimated decisions. The classifier builder 874 then utilizes the validation set to measure accuracy during training and make adjustments (if needed) to correct and improve the modeling complexity for the next iteration. This iterative refinement can then be repeated. The training process may stop when a certain criterion is satisfied. In one embodiment, the stopping criteria is reached as certain errors are minimized. The resulting classifier 878 can then be evaluated, utilizing several performance metrics, (e.g., Area Under Curve of Receiver Operating Characteristic or Precision/Recall curves, minimum per-class accuracy, F1, F2, FN scores, Sensitivity/Specificity, etc.) A proper threshold may then be selected to maximize performance on the hold-out testing set.

Classifier builder 874 can then test the trained classifier's 878 accuracy and performance on the hold-out dataset. The classifier 878 may be deployed only if it satisfies certain minimum performance criteria in order to maintain certain performance metrics and trigger warnings or retraining in cases where these metrics are not satisfied. If such criteria are met the classifier 878 may be deployed or otherwise stored for use by the classifier module 878 when a request for an approval or denial recommendations for an access request is received, as will now be discussed in more detail. In one embodiment, the classifier 878 may be deployed as a Java ARchive (JAR) file with a REpresentational State Transfer (REST) interface.

As may be recalled, embodiments of identity management system 850 may provide a decision support tool through the user interface 858. In this manner, when a user is presented with one or more access requests through the user interface 858 (e.g., during a certification campaign or the like), the user may indicate through the user interface 858 that a recommendation is desired. An approval or denial recommendation can then be determined by the intelligent agent 880 and presented to the user through the decision support tool of user interface 858. Such a recommendation may also be determined in advance of presenting the access request to the user for approval or denial such that a recommendation may be presented to the user (e.g., initially) in association with the access request for approval or denial.

A request for recommendations for one or more access requests may thus be received (e.g., from the identity management system 850 or user interface 858) through the intelligent agent interface 882. As may be understood, the training of classifier 878 may require a certain threshold amount of historical certification data or a certain amount of training time to achieve a desired performance metric. An embodiment of an intelligent agents 880 as disclosed may therefore also include a rules based agent 840. This rules based 840 may include a set of access request evaluation rules 842 one or more of which may be applied to an access request to determine an approval or denial recommendation and return such a recommendation to a user. The rules 842 applied by the rules based agent to determine such a recommendation may be based on criteria that may be determined with respect to, or utilizing, the identity graph stored in the graph store 866. The rules based agent 840 may use a single rule or a combination of rules to determine an approval or denial recommendation for a submitted access request. In one embodiment, for example, a score may be determined based on a number of rules the access request does (or does not) meet and this score compared to a threshold to determine an approval or denial recommendation for an access request.

For example, a rule employed by a rules based agent 840 may be based on a shortest distance as determined from the property graph, in terms of the length of the shortest path(s) from the identity node to the entitlement node or the number of "hops" or edges in a path between the entitlement and the identity of an access request in the identity graph. If there are no feasible paths from identity to the entitlement, or if the returned response is greater than a pre-determined threshold, for querying performance purposes, then the value for this feature may default to infinity or null. This shortest distance of number of hops may be compared to a threshold to determine if an approval or denial recommendation should be provided by the rules based agent 840. As another example of an identity graph based rule, an approval recommendation may be determined for an access request by the rules based agent 840 if the entitlement of the access request is associated with any one of a number of (e.g., the 10 closest) peers of the identity of the access request as determined from the identity graph.

Other rules may be used by rules based agent 840 in association with the identity graph based rules or as stand-alone rules. For example, another rule may determine if an approval or denial should be recommended for an access request based on whether a certain risk level or type of risk is associated with the entitlement of an access request, or if the entitlement of the access request has ever been approved or certified for the identity of the access request. Other rules that may be used by the rules based agent to determine an approval or denial recommendation for an access request may be based on if any other identity with the same department, location, or job title as the identity of the access requests has the entitlement of the submitted access request or if a threshold percentage of the identities of the same department, location, or job title as the identity of the access requests have the entitlement of the submitted access request. Other types of identity graph based rules, other types of rules, or combinations thereof may be employed by embodiments of rules based agent 840 and are fully contemplated herein.

Thus, when a request for an approval or denial recommendation for an access request is received by an intelligent agent 800, the intelligent agent 880 may determine if a classifier 878 has been trained or deployed. If no classifier has been trained or deployed, a rules based agent 840 may be utilized. Such a rules based agent 840 may be used, for instance for enterprises 800 that lack high quality governance data to train the classifier 878. Such a rules based agent 840 may be utilized, for instance, for a limited time period to help establish a baseline data set for certification data that a future classifier module 870 could use for training.

In some embodiment therefore, the intelligent agent 880 may apply the data enhancer 820 to determine features (e.g., primary or composite features) associated with the submitted access request. The intelligent agent can then request a recommendation for the access request through the rules based agent interface 844. When the request and associated access request are received by the rules based agent 840, the rules based agent 840 may apply the rules 842 to the submitted access request (with the associated features in embodiments where such features are determined) to obtain an approval or denial recommendation and return such a recommendation. This recommendation can then be returned by the intelligent agent 880 and eventually to the user through the user interface 858. A user's response (e.g., the user's actual approval or denial of the access request) can then be recorded. In this manner, not only are embodiments of intelligent agents and artificial intelligence based identity management systems able to provide a recommendation for an access request (even in those cases where a classifier cannot yet be sufficiently utilized), but additionally, the availability of high quality historical access request data (that may subsequently be used to train a classifier) may be enhanced.

If, however, a classifier 878 has been trained or deployed, the intelligent agents 880 may submit these access requests to the classifier module 870 in a request for a recommendation through the classifier interface 872. In one embodiment, the intelligent agent 880 may enhance the data of each received access request with values for at least some of the set of features used to train classifier 878 by requesting this enhanced data from the data enhancer 820 through the data enhancer interface 822. The data enhancer 820 may thus determine values for the set of features for each of these access requests in a manner substantially equivalently to the manner in which values for those features were determined for historical access requests when determining enhanced certification data 824. The access requests and the corresponding values for the features for each access request can then be submitted to the classifier module 870 through the classifier interface 872 in a request from an approval or denial recommendation.

The classifier module 870 can then 'score' each submitted access request using classifier 878 with an approval or denial decision. In particular, the classifier 870 may evaluate the values for the features associated with each access request according to the model to generate a probability of approval (or denial) and compare this probability against a recommendation threshold determined during training. Based on whether the probability is above or below (or equal) to the recommendation threshold, the recommendation for an access request may be determined to be an approval or a denial recommendation. These recommendations will be returned to the identity management system 850 and to the user through the user interface 858. A user's response (e.g., the user's actual approval or denial of the access request) can then be recorded. The availability of high quality historical access request data may thus be enhanced. Moreover, using such historical certification data, the classifier's 878 performance against actual human decisions may be evaluated. This evaluation can be used for further fine-tuning of future classifier 878, as well as to identify inaccurate human decisions.

In some cases, then, as a user may be presented with a recommendation for each access request with little surrounding context as to how the recommendation for a particular access request was derived or what factors influenced the determination of the recommendation, it may be desirable to offer the user some degree of insight into the recommendation, such as the features that influenced the determination of that recommendation. Accordingly, when recommendations are returned to the identity management system 850 and to the user through the user interface 858, the user interface 858 may offer an interface to allow a user to obtain additional information on one or more of the provided recommendations (e.g., referred to as an interpretation). Such an interpretation may be utilized by a user to probe a particular recommendation and be provided with the top or most influential features for that particular recommendation. This capability, in turn, may will help the user to relate to the recommendation issued by the classifier and incite confidence in the classifier's results. Consequently, by providing such an interpretation, a user may gain confidence in the recommendations provided and the identity management system itself. Additionally, these recommendations may aid in the compliance with certain auditing policies or regulatory requirements.

In some embodiments when the user requests such interpretations for one or more access requests, these access requests may be submitted to the intelligent agent 880 through the intelligent agent interface 882 in a request for an interpretation for those access requests. To determine an interpretation for these access requests, intelligent agent may include interpreter 830. In some embodiments, interpreter 830 may utilize a principle referred to as 'Interpretability of Models' whereby the interpreter 830 may be utilized as an independent process from the classifier's 878 training. This interpreter 830 can be queried to provide explanations in terms of how much and what type (positive or negative) of influence did the features have over the classifier modules 870 decision.

The access requests for which an interpretation is desired can be submitted to the interpreter 830 by the intelligent agent 880 through the interpreter interface 832. For each of these access requests (e.g., identity and entitlement pair), the local model builder 834 may build a localized model for that access request by querying the classifier 878 (e.g., through classifier interface 872) in a "neighborhood" of that access request to build a local generalized linear model for that access request out of what may be a highly non-linear classifier 878. This querying may be accomplished by determining values for a set of features associated with the access request (e.g., one or more of the same features used to train the classifier) and varying one or more of these values within a tolerance for a plurality of requests to the classifier module 870 to determine approval or denial recommendations for values for the set of features that are close, but not the same as, the values for those features associated with the access request itself.

In one embodiment, the local builder 834 may be, for example, based on Local Interpretable Model-Agnostic Explanations (LIME). Embodiments of such a localized model may, for example, be a logistic regression model or the like with a set of coefficients for a corresponding set of features. While such an approximation may be valid within a small neighborhood of the access request, the coefficients of the approximate (e.g., linear) model may be utilized to provide the most influential features. A feature corresponding to a coefficient of the localized model with a large magnitude may indicates a strong influence, while the sign of the coefficient will indicate whether the effect of the corresponding feature was in the positive (approval) or negative (denial). Based on the magnitude or signs of the coefficients associated with each feature of the localized model for the access request a top number (e.g., top 2, top 5, etc.) of influential features (e.g., positive or negative) may be determined.

The top set of features that resulted in an approval or denial decision for the access request may then be returned by the interpreter 830 and the intelligent agent 880 such that the top features can be displayed to the user through the user interface 858. In one embodiments, these features may be displayed along with their absolute or relative magnitude, in for example a histogram or other graphical presentation. Alternatively, an English language explanation associated with one or more of the determined features may be determined and presented in the interface. For example, the interpreter 830 may have an explanation mapping table that associates features or combinations of features with corresponding English language explanations. When the top features are determined, one or more of the top features may be used to determine a corresponding English language explanation from the explanation table and this explanation displayed through the user interface 858.

Figure 9:
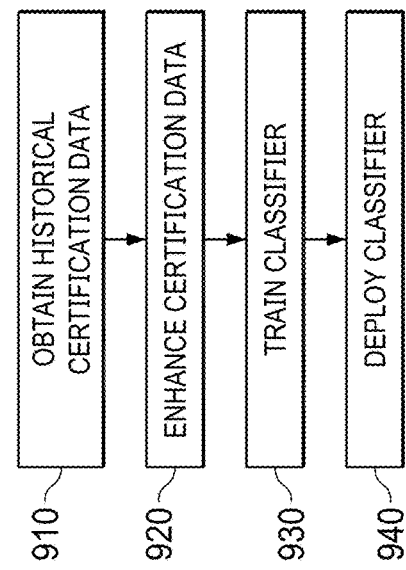
FIG. 9 is a flow diagram of one embodiment of a method for building a classifier for an intelligent agent.

Moving to FIG. 9, one embodiment of a method for building a classifier is disclosed. Embodiments of such a method may be employed, for example, by the classifier builder in an intelligent agent. Initially at step 910 historical certification data may obtained. This historical transaction data may include historical data on whether past access requests have been approved or denied. Specifically, a user may interact with an identity management system through a user interface to access or manipulate data on identities, entitlements, events or generally perform identity management with respect to enterprise environment. These interactions may include approving or denying access requests (e.g., atomically or during a certification campaign) In other words, the manager or an access entitlement owner may be presented with a identity and an associated entitlement (i.e., an access request) and asked to approve or deny the assignment of the entitlement to the identity. Similarly, a manager or an access entitlement owner may be asked to evaluate access requests to approve or deny a particular entitlement to an identity.

These access requests (e.g., parametrized or labeled using identity and entitlement pairs) may thus be presented to a user (e.g., a manager or an access entitlement owner) of the identity management system. The user interface can be used by the user to approve or deny the access request. The identity management system can maintain the set of historical certification data associated with past certification campaigns or access requests. The historical certification data may include a set of access requests (e.g., entitlement and identity pairs), where each access request may be associated with an approval or denial decision (e.g., whether the access request was approved or denied by the user through the interface) and a time (e.g., time stamp) when the approval or denial of the access request (or campaign) occurred. This historical certification data may, for example, be represented as set of rows in a table, each row corresponding to a historical access request decision and including values for the associated set of features.

At step 920, this historical certification data may be enhanced. Specifically, the historical certification data may be enhanced with one or more determined, generated or synthesize features (collectively determined composite features) not present in the original historical certification data. The values for these features for an access request may, for example, be included in row of the table of historical certification data corresponding to that access request to create a set of enhanced certification data. This enhanced certification data for an access request may thus include primary features—existing data that is harvested from the enterprise in association with historical certifications and stored in the historical certification data, and composite features—data for features of an access request that can subsequently be determined. These composite features may include features determined based on the identity graph as stored in the graph data store as discussed above.

The obtained historical certification data may include a set of access requests (e.g., entitlement identity pairs, where each entitlement or identity may be identified by a corresponding alphanumeric identifier) along with a historical approval or denial decision for that access request, a time stamp indicating when the approval or denial decision took place. This historical certification data can be enhanced using identity data from the identity management system to determine additional data associated with the identity and entitlement of each access request, including for example, a title, location, group or department associated with the identity, an identification of whether an entitlement is a privileged entitlement, or other data associated with the identity or entitlement. These features may, in turn, be used to determine values for other primary features as have been discussed herein.

In addition to the values for primary features for the set of access requests of the historical certification data, the historical certification data may also be enhanced by determining values for composite features for the historical access requests as has been discussed. In one embodiment, one or more of these composite features may be determined based on an identity graph created by the identity management system. The enhanced certification data determined may thus include a set of (historical) access requests and associated time stamps, a decision associated with each access request (e.g., approval or denial) and for each access request, values for a set of primary and composite features.

Using this enhanced certification data, the classifier may be trained at step 930 and deployed at step 940. In one embodiment, for example, the classifier may be an eXtreme Gradient (XG) Boost model implemented in the H2O machine learning platform. It will be apparent, however, that other classifiers may be utilized in association with embodiments herein, and similarly built on the features as disclosed herein without loss of generality.

The training and deployment of a classifier may be done on a triggered or scheduled basis whereby the current enhanced certification data is obtained and the classifier updated based on the current enhance historical certification data. Specifically, in one embodiment an XGBoost classifier may be trained by randomly splitting the enhanced certification data into three parts or sets: training, validation, and testing, such that 80-90% of the data may be in the training set, 5% may be in the validation set and 15-5% of the data may be in the testing set. The training process may run iteratively by observing patterns in data and making estimated decisions. The validation set can be used to measure accuracy during training and make adjustments (if needed) to correct and improve the modeling complexity for the next iteration. This iterative refinement can then be repeated. The training process may stop when a certain criterion is satisfied. In one embodiment, the stopping criteria is reached as certain errors are minimized.

The resulting classifier can then be evaluated, utilizing several performance metrics, and a proper threshold may then be selected to maximize performance on the hold-out testing set. The classifier may be deployed only if it satisfies certain minimum performance criteria. If such criteria are met the classifier may be deployed or otherwise stored for use when a request for an approval or denial recommendations for an access request is received. In one embodiment, the classifier 878 may be deployed as a JAR file with a REST interface.

Figure 10:
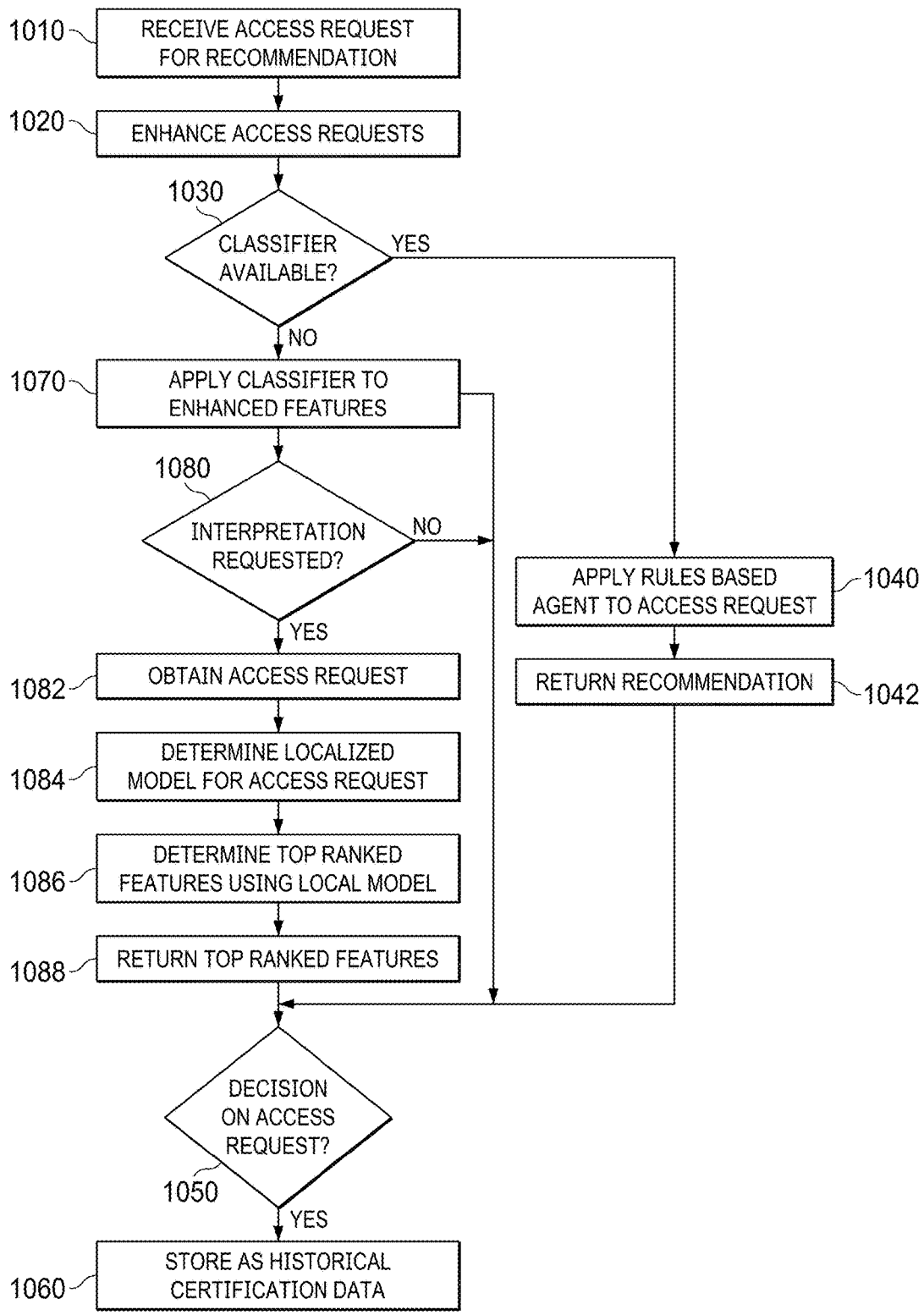
FIG. 10 is a flow diagram of one embodiment of a method for determining a recommendation for an access request in an identity management system.

FIG. 10 depicts an embodiment of a method that may be employed by an intelligent agent of an identity management system to determine a recommendation for an access request. At step 1010 the access request may be received. As discussed previously, it is desired in identity governance solutions to provide a decision support agent that can be used to recommend approval or denial for an access request (e.g., an identity and entitlement pair) that may be applied easily and substantially in real-time in bulk to a large number of these access requests without loss of accuracy or efficacy. Accordingly, embodiments of an identity management system may provide a decision support tool through a user interface. In this manner, when a user is presented with one or more access requests through the user interface (e.g., during a certification campaign or the like), the user may indicate through the user interface that a recommendation is desired. An approval or denial recommendation can then be determined and presented to the user through the decision support tool or user interface. Such a recommendation may also be determined in advance of presenting the access request to the user for approval or denial such that a recommendation may be presented to the user (e.g., initially) in association with the access request for approval or denial.

When an access request for which a recommendation is to be determined is received, this data of the access request may be enhanced at step 1020 by determining, for that access request, values for the same features used to train the classifier. The determination of the values for these features for the access request may be accomplished in substantially the same manner as the determination of those features for historical access requests as discussed previously herein.

At step 1030, it can then be determined if a classifier is available. If no classifier has been trained or deployed (NO branch of step 1030), a rules based agent may be used to generate a recommendation for the access request at step 1040. Such a rules based agent may be used, for instance, for enterprises that lack high quality governance data to train the classifier. A rules based agent may be utilized, for example, for a limited time period to help establish a baseline data set for certification data that could be used in the future for training a classifier.

In some embodiment therefore, if the rules based agent is to be applied, the values for at least some of the features (e.g., primary or composite features) associated with the submitted access request may be determined such that the rules based agent may apply recommendation rules of the rules based agent to the submitted access request to obtain an approval or denial recommendation and return such a recommendation. This recommendation can then be returned to the user at step 1042 through the user interface.

A user's response (e.g., the user's decision regarding actual approval or denial of the access request) can then be recorded at step 1060 if it is received at step 1050 (YES branch of step 1050). In this manner, not only are embodiments of artificial intelligence based identity management systems able to provide a recommendation for an access request (even in those cases where a classifier cannot yet be sufficiently utilized), but additionally, the availability of high quality historical access request data (that may subsequently be used to train a classifier) may be enhanced.

Returning to step 1030, if a classifier has been deployed by the identity management system (YES branch of step 1030), the classifier can be applied to an access request (with the associated features) to obtain an approval or denial recommendation at step 1070. In one embodiment, the data of the access request may be enhanced with values for at least some of the set of features used to train classifier in a manner substantially equivalent to the manner in which values for those features were determined for historical access requests when determining enhanced certification data. The access requests and the corresponding values for the features for each access request can then be submitted to the classifier through the classifier interface in a request from an approval or denial recommendation.

The below table list one example of historical certification data, where a row corresponds to an access request for a recommendation having an entitlement and identity pair, along with data determined for a set of values for features. Note here that the "response" column for an approval or denial decision is unpopulated. When such data is submitted to a classifier, the classifier may evaluate the access request based on the associated data (e.g., the feature data in the row) and populate the "response" column with a value of "1" indicating an approval recommendation or a "0" indicating a denial recommendation.

| identity_id | entitlement_id | certEnt12 Mon | approvalTitle12 Mon | approval Location12 Mon | density Department12 Mon | density Title12 Mon | density Location12 Mon | response |
|---|---|---|---|---|---|---|---|---|
| 8a84cb6f5eb61 2d0015ebffe11 cc6e96 | 8a84cbe43e388 0d5013ea099ba 2f48ec | −1 | −1 | −1 | −1 | −1 | −1 | |
| 8a84cb6f5ec09 147015ec0e38 bdb0190 | 8a84cbe43e388 0d5013e9f9a0e 8872e7 | −1 | −1 | −1 | −1 | .45 | −1 | |
| 8a84cb6f5ec09 147015ec1ffb8 7a1812 | 8a84cbe43e388 0d5013ea00b84 924987 | −1 | −1 | −1 | .53 | .3 | .42 | |
| 8a84cb6f5f0d0 e1e015f2b464 1b54231 | 8a84cbe444c91 272014594f222 e02cd1 | −1 | −1 | −1 | .61 | .45 | .63 | |

The classifier can then 'score' the submitted access request with an approval or denial decision. In particular, the classifier may evaluate the values for the features associated with each access request according to the model to generate a probability of approval (or denial) and compare this probability against a recommendation threshold determined during training. Based on whether the probability is above or below (or equal) to the recommendation threshold, the recommendation for an access request may be determined to be an approval or a denial recommendation. This recommendation can then be returned to the user at step 1042 through the user interface. A user's response (e.g., the user's decision regarding actual approval or denial of the access request) can then be recorded at step 1060 if it is received at step 1050 (YES branch of step 1050). The availability of high quality historical access request data may thus be enhanced. Moreover, using such historical certification data, the classifier's performance against actual human decisions may be evaluated and used for further fine-tuning of future versions of the classifier as well as to identify inaccurate human decisions.

Additionally, in some embodiments the user may request an interpretation of a recommendation provided for a particular access request (YES branch of step 1080). In some cases, then, as a user may be presented with a recommendation for each access request with little surrounding context as to how the recommendation for a particular access request was derived or what factors influenced the determination of the recommendation, it may be desirable to offer the user some degree of insight into the recommendation, such as the features that influenced the determination of that recommendation. Accordingly, when recommendations are returned through the user interface, the user interface may allow a user to obtain additional information on one or more of the provided recommendations (e.g., referred to as an interpretation).

When the user requests such interpretations for the access requests, the access requests may be obtained at step 1082 and a localized model built for that access request at step 1084 by querying the classifier of the identity management system in a "neighborhood" of that access request to build a generalized local linear model for that access request. This querying may be accomplished by determining values for a set of features associated with the access request (e.g., one or more of the same features used to train the classifier) and varying one or more of these values within a tolerance for a plurality of requests to the classifier to determine approval or denial recommendations for values for the set of features that are close, but not the same as, the values for those features associated with the access request itself.

In one embodiment, the localized model may be based on LIME. Embodiments of such a localized model may be, for example, a logistic regression model or the like with a set of coefficients for a corresponding set of features. While such an approximation may be valid within a small neighborhood of the access request, the coefficients of the approximate (e.g., linear) model may be utilized to provide the most influential features. A feature corresponding to a coefficient of the localized model with a large magnitude may indicates a strong influence, while the sign of the coefficient will indicate whether the effect of the corresponding feature was in the positive (approval) or negative (denial). Based on the magnitude or signs of the coefficients associated with each feature of the localized model for the access request a top number (e.g., top 2, top 5, etc.) of influential features (e.g., positive or negative) may be determined.

The top set of features that resulted in an approval or denial decision for the access request may thus be determined based on the coefficients of the localized model at step 1086 and displayed to the user through the user interface. In one embodiments, these features may be displayed along with their absolute or relative magnitude, in for example a histogram or other graphical presentation. Alternatively, an English language explanation associated with one or more of the determined features may be determined and presented in the interface.

Figure 11:
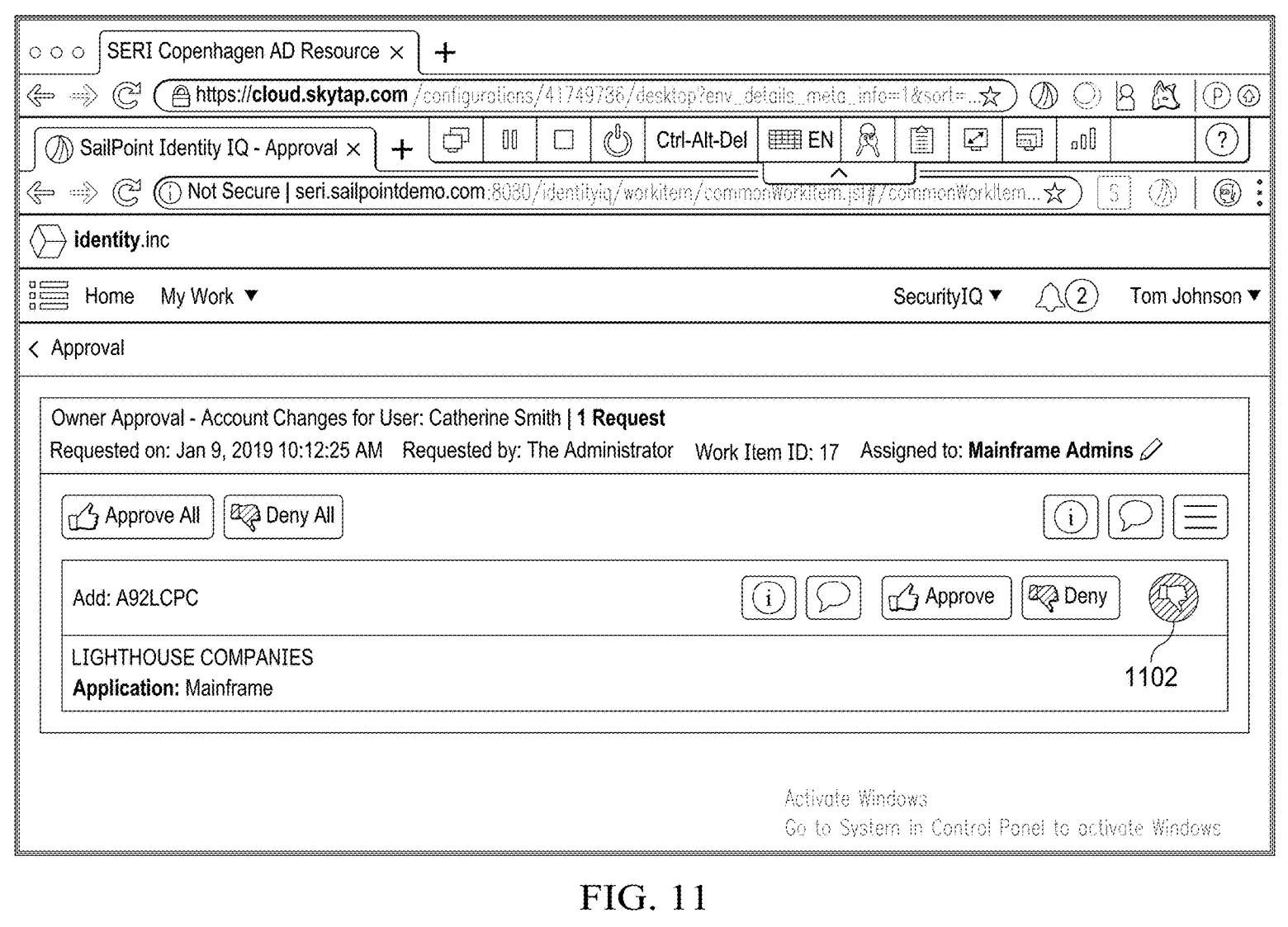
Figure 12:
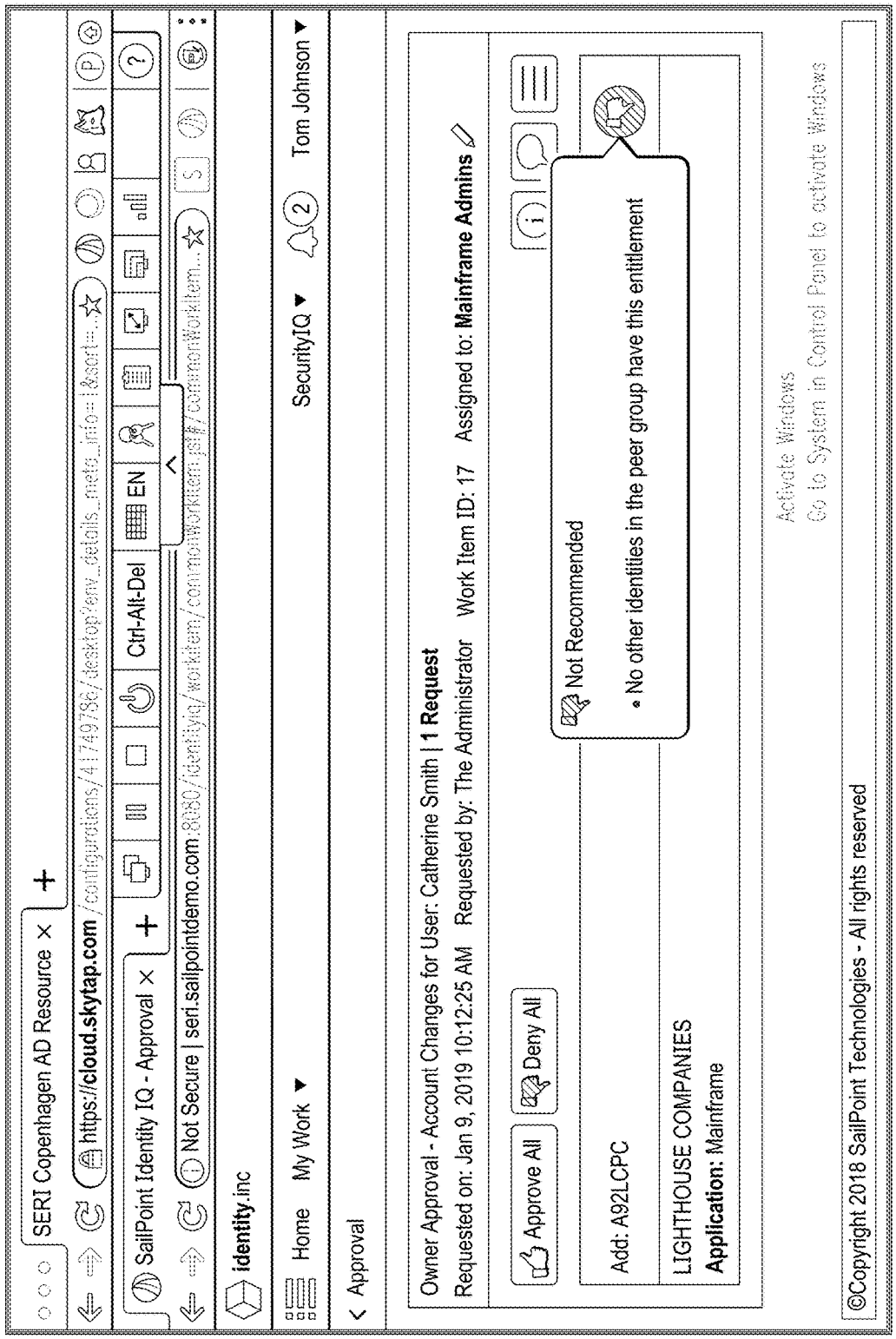

FIGS. 11 and 12 depict embodiments of these types of interfaces that may be utilized by embodiments of an identity management system as disclosed herein. Looking first at FIG. 11, one embodiment of an interface for an identity management system that presents an access request for approval or denial to a user is depicted. In this example, a user "Joseph Thompson" is being presented with an access request for approval or denial. The identity for that access request being presented is "Catherine Simmons" and the entitlement for the access request is the entitlement "A92LCPC" associated with the "Mainframe" application. Additionally, here, the user has been presented with an icon 1102 (e.g., a thumbs down icon) representing a denial recommendation for the presented access request.

Continuing with the same example, FIG. 12 depicts the interface when the user "hovers" his cursor over the icon 1102 representing the denial recommendation. In the depicted embodiment, a pop up box may appear with an English language explanation of the interpretation of the "Not Recommended" denial recommendation. This English language explanation denotes that "No other identities in the peer group have this entitlement." This explanation may have been determined based on, for example, a feature determined for the access request (e.g., "Catherine Simmons" and "A92LCPC") associated with a density of the entitlement of the access request within a peer group of the identity graph associated with the identity of the access request.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system, comprising:
a graph data store;
a processor;
a non-transitory, computer-readable storage medium, including computer instructions for:
obtaining historical certification data for an enterprise, the historical certification data comprising a set of historical certification decisions, each historical certification decision comprising a historical access request including an identity and an entitlement, and an approval or denial decision for the historical access request;
enhancing the historical certification data with a value for a feature for each historical access certification decision, the value for the feature determined from an identity graph associated with the enterprise;
training a classifier with the enhanced historical certification data;
receiving an access request including an identity and an entitlement and a request for an approval or denial decision for the access request;
enhancing the received access request with a value for the feature, based on the identity or entitlement of the access request and the identity graph associated with the enterprise;
submitting the enhanced access request to the classifier;
receiving an approval or denial decision for the enhanced access request from the classifier; and
returning the approval or denial decision for the access request to a user of the identity management system, wherein the identity graph associated with the enterprise comprises:
generating a first identity graph from the identity management data by:
creating a node of the first identity graph for each of a set of identities determined from identity management data of the enterprise, the identity management data comprising data on the set of identities and a set of entitlements associated with the set of identities utilized in identity management in the enterprise;
for each first identity and second identity that share at least one entitlement of the set of entitlements, creating an edge of the first identity graph between a first node representing the first identity and a second node of the identity graph representing the second identity, and
generating a similarity weight for each edge of the first identity graph between each first node and second node based on a number of the set of entitlements shared between the first identity represented by the first node and the second identity represented by the second node.

2. The system of claim 1, wherein the feature is one of a set of features, the set of features comprising a primary feature and a composite feature.

3. The system of claim 2, wherein the feature includes a shortest distance of any path in the identity graph between a node of the identity graph associated with the identity of the access request and a node of the identity graph associated with the entitlement of the access request, or a density of the entitlement of the access request within a peer group of the identity graph associated with the identity of the access request.

4. The system of claim 2, wherein the instructions further comprise instructions for:
receiving a request for an interpretation of the approval or denial decision for the access request;
determining a top set of features that resulted in the approval or denial decision based on the classifier; and
returning the top set of features to the user.

5. The system of claim 4, wherein determining the top set of features comprise querying the classifier to build a local model for the access request from the classifier and determining the top set of features from the local model.

6. The system of claim 5, wherein the classifier includes an XGBoost model.

7. The system of claim 1, wherein the instructions further comprise instructions for determining a user approval or denial decision for the access request, and storing the user approval or denial decision and the access request as part of the historical certification data.

8. A method, comprising:
obtaining historical certification data for an enterprise, the historical certification data comprising a set of historical certification decisions, each historical certification decision comprising a historical access request including an identity and an entitlement, and an approval or denial decision for the historical access request;
enhancing the historical certification data with a value for a feature for each historical access certification decision, the value for the feature determined from an identity graph associated with the enterprise;
training a classifier with the enhanced historical certification data;
receiving an access request including an identity and an entitlement and a request for an approval or denial decision for the access request;
enhancing the received access request with a value for the feature, based on the identity or entitlement of the access request and the identity graph associated with the enterprise;
submitting the enhanced access request to the classifier;
receiving an approval or denial decision for the enhanced access request from the classifier; and returning the approval or denial decision for the access request to a user of the identity management system, wherein the identity graph associated with the enterprise comprises:

generating a first identity graph from the identity management data by:

creating a node of the first identity graph for each of a set of identities determined from identity management data of the enterprise, the identity management data comprising data on the set of identities and a set of entitlements associated with the set of identities utilized in identity management in the enterprise;

for each first identity and second identity that share at least one entitlement of the set of entitlements, creating an edge of the first identity graph between a first node representing the first identity and a second node of the identity graph representing the second identity, and generating a similarity weight for each edge of the first identity graph between each first node and second node based on a number of the set of entitlements shared between the first identity represented by the first node and the second identity represented by the second node.

9. The method of claim 8, wherein the feature is one of a set of features, the set of features comprising a primary feature and a composite feature.

10. The method of claim 9, wherein the feature includes a shortest distance of any path in the identity graph between a node of the identity graph associated with the identity of the access request and a node of the identity graph associated with the entitlement of the access request, or a density of the entitlement of the access request within a peer group of the identity graph associated with the identity of the access request.

11. The method of claim 9, wherein the instructions further comprising:

receiving a request for an interpretation of the approval or denial decision for the access request;

determining a top set of features that resulted in the approval or denial decision based on the classifier; and returning the top set of features to the user.

12. The method of claim 11, wherein determining the top set of features comprise querying the classifier to build a local model for the access request from the classifier and determining the top set of features from the local model.

13. The method of claim 12, wherein the classifier includes an XGBoost model.

14. The method of claim 8, further comprising determining a user approval or denial decision for the access request, and storing the user approval or denial decision and the access request as part of the historical certification data.

15. A non-transitory computer readable medium, comprising instruction for:

obtaining historical certification data for an enterprise, the historical certification data comprising a set of historical certification decisions, each historical certification decision comprising a historical access request including an identity and an entitlement, and an approval or denial decision for the historical access request;

enhancing the historical certification data with a value for a feature for each historical access certification decision, the value for the feature determined from an identity graph associated with the enterprise;

training a classifier with the enhanced historical certification data;

receiving an access request including an identity and an entitlement and a request for an approval or denial decision for the access request;

enhancing the received access request with a value for the feature, based on the identity or entitlement of the access request and the identity graph associated with the enterprise;

submitting the enhanced access request to the classifier;

receiving an approval or denial decision for the enhanced access request from the classifier; and returning the approval or denial decision for the access request to a user of the identity management system, wherein the identity graph associated with the enterprise comprises:

generating a first identity graph from the identity management data by:

creating a node of the first identity graph for each of a set of identities determined from identity management data of the enterprise, the identity management data comprising data on the set of identities and a set of entitlements associated with the set of identities utilized in identity management in the enterprise;

for each first identity and second identity that share at least one entitlement of the set of entitlements, creating an edge of the first identity graph between a first node representing the first identity and a second node of the identity graph representing the second identity, and generating a similarity weight for each edge of the first identity graph between each first node and second node based on a number of the set of entitlements shared between the first identity represented by the first node and the second identity represented by the second node.

16. The non-transitory computer readable medium of claim 15, wherein the feature is one of a set of features, the set of features comprising a primary feature and a composite feature.

17. The non-transitory computer readable medium of claim 16, wherein the feature includes a shortest distance of any path in the identity graph between a node of the identity graph associated with the identity of the access request and a node of the identity graph associated with the entitlement of the access request, or a density of the entitlement of the access request within a peer group of the identity graph associated with the identity of the access request.

18. The non-transitory computer readable medium of claim 16, wherein the instructions further comprise instructions for:

receiving a request for an interpretation of the approval or denial decision for the access request;

determining a top set of features that resulted in the approval or denial decision based on the classifier; and returning the top set of features to the user.

19. The non-transitory computer readable medium of claim 18, wherein determining the top set of features comprise querying the classifier to build a local model for the access request from the classifier and determining the top set of features from the local model.

20. The non-transitory computer readable medium of claim 19, wherein the classifier includes an XGBoost model.

21. The non-transitory computer readable medium of claim 15, wherein the instructions further comprise instructions for determining a user approval or denial decision for the access request, and storing the user approval or denial decision and the access request as part of the historical certification data.

\* \* \* \* \*